United States Patent
Hecht et al.

(10) Patent No.: US 6,783,069 B1
(45) Date of Patent: Aug. 31, 2004

(54) METHOD AND APPARATUS FOR IMPLEMENTING A CAMERA MOUSE

(75) Inventors: David L. Hecht, Palo Alto, CA (US);
L. Noah Flores, Woodside, CA (US);
Glen W. Petrie, Los Gatos, CA (US);
Sven Karlsson, San Jose, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/498,609

(22) Filed: Feb. 4, 2000

Related U.S. Application Data

(63) Continuation-in-part of application No. 09/456,105, filed on Dec. 6, 1999.

(51) Int. Cl.[7] ................................................ G06K 7/10
(52) U.S. Cl. ...................................................... 235/454
(58) Field of Search ................................ 235/454, 435, 235/439, 472.01; 382/312, 313

(56) References Cited

U.S. PATENT DOCUMENTS

| | | | |
|---|---|---|---|
| 3,541,248 A | 11/1970 | Young ........................ | 178/6.6 |
| 4,804,949 A | 2/1989 | Faulkerson ................. | 340/710 |
| 4,906,843 A * | 3/1990 | Jones et al. ................. | 250/221 |
| 5,012,349 A | 4/1991 | de Fay ........................ | 358/296 |
| 5,128,525 A | 7/1992 | Stearns et al. | |
| 5,140,677 A | 8/1992 | Fleming et al. ............. | 395/159 |
| 5,241,166 A * | 8/1993 | Chandler ..................... | 235/494 |
| 5,301,243 A | 4/1994 | Olschafskie et al. | |
| 5,304,787 A * | 4/1994 | Wang ..................... | 235/462.09 |
| 5,388,203 A | 2/1995 | Kaneko ....................... | 395/159 |
| 5,428,212 A * | 6/1995 | Tani et al. .............. | 235/472.01 |
| 5,477,012 A | 12/1995 | Sekendur ..................... | 178/18 |
| 5,512,264 A * | 4/1996 | Wang et al. .................. | 380/51 |
| 5,521,372 A | 5/1996 | Hecht et al. | |
| 5,574,804 A | 11/1996 | Olschafskie et al. | |
| 5,625,765 A | 4/1997 | Ellenby et al. | |

(List continued on next page.)

FOREIGN PATENT DOCUMENTS

| | | |
|---|---|---|
| EP | 0 254 844 A2 | 1/1988 |
| EP | 0 469 864 A | 2/1992 |
| EP | 0 484 888 A2 | 5/1992 |
| EP | 0 923 050 A2 | 8/1999 |
| JP | 2000059794 A | 2/2000 |
| JP | 2000099257 A | 4/2000 |
| WO | WO 00/73981 A1 | 12/2000 |
| WO | WO 01/01670 A1 | 1/2001 |

OTHER PUBLICATIONS

The Anoto Pen—Technical Description (2 pages) as printed from the Internet, May 16, 2000.
The Anoto Pen—Technical Pattern (2 pages) as printed from the Internet, May 16, 2000.

(List continued on next page.)

Primary Examiner—Karl D. Frech
Assistant Examiner—Jamara A. Franklin

(57) ABSTRACT

A mouse incorporating a camera captures an image of embedded data from a substrate under the mouse. The embedded data in the image is decoded to determine address or location information coded in the embedded data. Based on the decoded information and other user input signals, such as mouse button selection signals, the computer executes operations. The mouse also has a display controlled by the computer for providing visual feedback to a user. The display might generate an image of the substrate area under the mouse, making it appear to the user as if they are looking through the mouse directly onto the substrate. The display may also generate visual feedback regarding operations occurring in the computer, such as selection or other computer operations.

28 Claims, 21 Drawing Sheets

U.S. PATENT DOCUMENTS

| | | | |
|---|---|---|---|
| 5,633,489 A | * 5/1997 | Dvorkis et al. | 235/472 |
| 5,636,292 A | 6/1997 | Rhoads | |
| 5,725,253 A | * 3/1998 | Salive et al. | 283/67 |
| 5,745,177 A | 4/1998 | Lamoure | |
| 5,765,176 A | 6/1998 | Boomberg | |
| 5,825,933 A | * 10/1998 | Hecht | 382/243 |
| 5,905,819 A | 5/1999 | Daly | |
| 5,937,110 A | 8/1999 | Petrie et al. | 382/306 |
| 5,945,661 A | * 8/1999 | Nukui et al. | 235/472 |
| 5,951,056 A | 9/1999 | Fukuda et al. | 283/93 |
| 5,988,505 A | 11/1999 | Shellhammer | 235/462.09 |
| 5,994,710 A | * 11/1999 | Knee et al. | 250/557 |
| 6,036,094 A | * 3/2000 | Goldman et al. | 235/462.45 |
| 6,036,095 A | * 3/2000 | Seo | 235/472.01 |
| 6,037,936 A | 3/2000 | Ellenby et al. | |
| 6,122,403 A | 9/2000 | Rhoads | |
| 6,141,441 A | 10/2000 | Cass et al. | |
| 6,192,138 B1 | 2/2001 | Yamadaji | |
| 6,201,879 B1 | 3/2001 | Bender et al. | |
| 6,310,988 B1 | 10/2001 | Flores et al. | 382/313 |

OTHER PUBLICATIONS

The Anoto Pen—The Pen (2 pages) as printed from the Internet, May 16, 2000.

The Anoto Pen—The Infrastructure (2 pages) as printed from the Internet, May 16, 2000.

The Anoto Pen—White Paper (4 pages) as printed from the Internet, May 16, 2000.

"Anoto Technology Takes Pen and Paper into the Digital Age" as printed from the Internet, May 16, 2000.

Arai et al., "PaperLink: A Technique for Hyperlinking from Real Paper to Electronic Content," CHI 97 Electronic Publications: Papers.

Hecht, "Embedded Data Glyph Technology for Hardcopy Digital Documents," Proceedings Reprint, 2171:341–352 (1994).

B. Ullmer, et al., "The metaDESK: Models and Prototypes for Tangible User Interfaces, " Proceedings of UIST '97, Oct. 14–17, 1997, ACM, pp. 1–10.

D. Schmalstieg, et al., "Using Transparent Props for Interaction With The Virtual Table," 1999 Symposium on Interactive 3D Graphics, Atlanta, GA, USA, ACM, pp. 147–153, and 232.

* cited by examiner

METHOD AND APPARATUS FOR IMPLEMENTING A CAMERA MOUSE

CROSS-REFERENCES TO RELATED APPLICATIONS

This application is a continuation-in-part of U.S. patent application Ser. No. 09/456,105, entitled METHOD AND APPARATUS FOR SPATIALLY REGISTERING INFORMATION USING EMBEDDED DATA and filed Dec. 6, 1999, and is related to U.S. patent application Ser. No. 09/455,304, entitled METHOD AND APPARATUS FOR DECODING ANGULAR ORIENTATION OF LATTICE CODES and filed Dec. 6, 1999, and is related to U.S. patent application Ser. No. 09/454,526, entitled METHOD AND APPARATUS FOR DISPLAY OF SPATIALLY REGISTERED INFORMATION USING EMBEDDED DATA and filed Dec. 6, 1999.

BACKGROUND OF THE INVENTION

Apparatus, methods, and articles of manufacture consistent with the invention relate generally to a user input device, and in particular to a user input device for capturing an image of a substrate having embedded data, decoding the embedded data in the captured image, and processing the decoded information.

One type of conventional user input device is a portable device connected to a computer. A user manipulates the device to provide input signals to the computer. A mouse is an example of such a conventional user input device.

The computer responds to the signals by executing operations corresponding to the signals. For a mouse, the signals typically represent movement of the mouse by the user, to which the computer responds by moving a cursor on a display screen, and mouse button activation, to which the computer responds by executing operations, such as selection.

One problem with conventional user input devices is their limited signaling capabilities. For example, a keyboard typically only sends keystroke information to the computer, and a mouse only sends movement and button activation signals. The limited signaling capabilities place inherent limitations on the depth of information a user provides to the computer through the input device.

A camera pen has been proposed in U.S. application Ser. No. 09/144,250, entitled "Methods and Apparatus for Camera Pen," filed on Aug. 31, 1998, now issued as U.S. Pat. No. 6.310.988 B1, which is expressly incorporated herein by reference, for capturing an area of a substrate for further processing. Although the camera pen is useful for capturing an area of a substrate, it has limited user feedback capabilities, and limited capabilities for sending signals to the computer.

What is needed is a user input device and related methods that do not suffer from the limitations of conventional user input devices.

SUMMARY OF THE INVENTION

Apparatus, methods, and articles of manufacture consistent with the present invention provide a user input device for capturing an image of a substrate having embedded data embodied thereon. More particularly, the user input device comprises a camera mouse image capture device that captures an image including embedded code. In one embodiment, the camera mouse includes an active display. The display may provide, for example, a combination of captured image information and information that augments the image. The augmented information is registered with the captured image in the combined display.

Consistent with the principles of the invention, a camera mouse includes an image sensor for capturing an image of a substrate area in response to user selection signals. The image is decoded to determine address or location information from the captured area and execute a corresponding operation, if necessary. For example, in response to the decoded information, additional information may be displayed on the mouse, or further processing, such as word processing or spreadsheet functions may be performed in response to the decoded information.

Additional objects and advantages of the invention will be set forth in part in the description which follows, and in part will be clear from the description, or may be learned by practice of the invention. Objects and advantages of the invention will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DETAILED DESCRIPTION OF THE INVENTION

Reference will now be made in detail to embodiments of the invention, examples of which are illustrated in the accompanying drawings. Methods, apparatus, and articles of manufacture disclosed herein consistent with the principles of the invention register first information having embedded data with second information.

Figure 1:
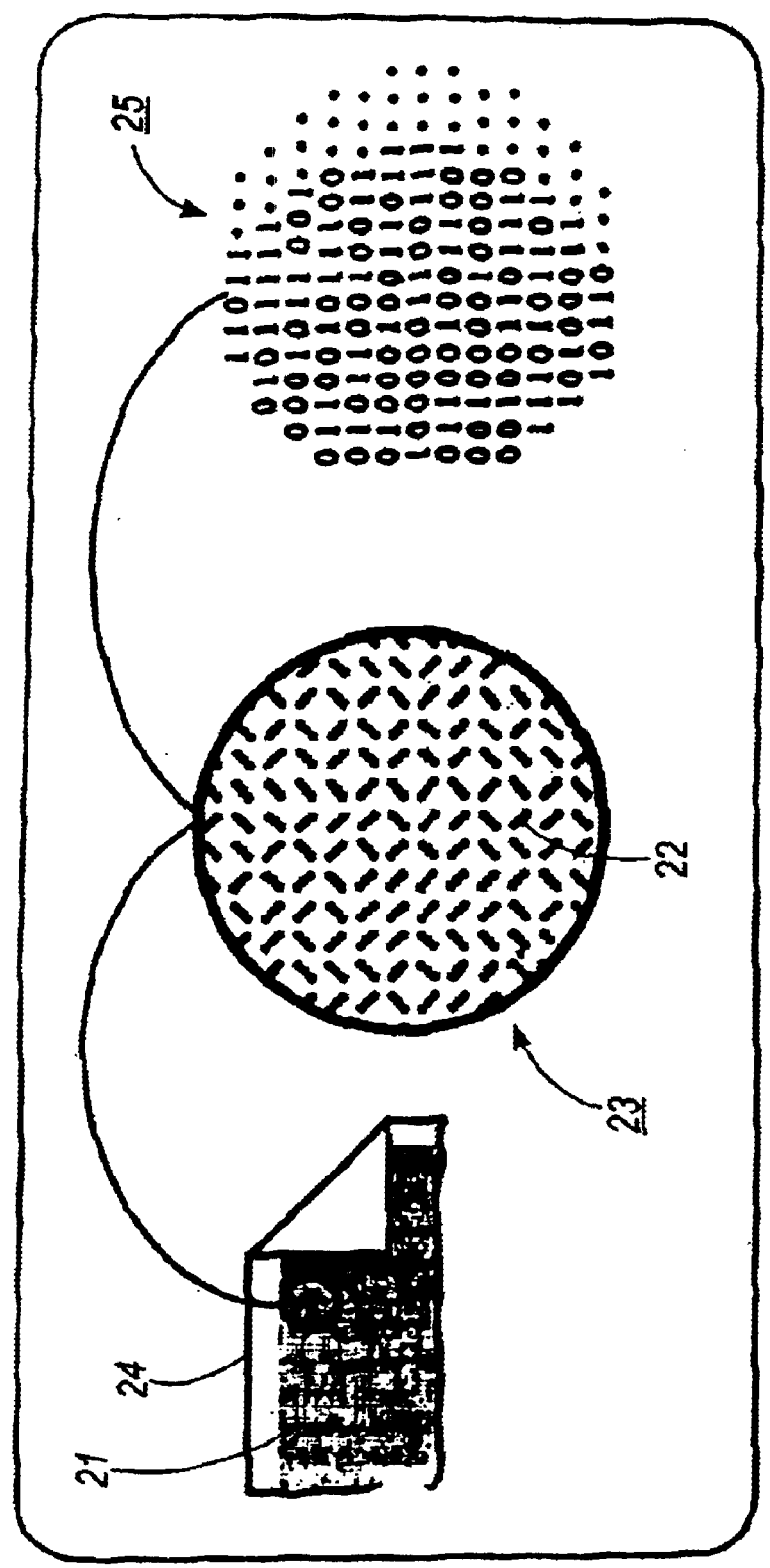
FIG. 1 illustrates an overview of the properties of glyph marks and codes embodied in the glyph marks.

FIG. 1 illustrates glyph marks and codes embodied in the glyph marks. Glyph marks are typically implemented as a fine pattern on a substrate, such as glyph marks 21 on substrate 24. Glyph marks are not easily resolved by the unaided human eye. Thus, glyph marks typically appear to the unaided eye as having a uniform gray scale appearance or texture, as illustrated by glyph marks 21 in FIG. 1.

Enlarged area 23 shows an area of glyph marks 21. Glyph marks 21 are comprised of elongated slash-like marks, such as glyph 22, and are typically distributed evenly widthwise and lengthwise on a lattice of glyph center points to form a rectangular pattern of glyphs. Glyphs are usually tilted backward or forward, representing the binary values of "0" or "1", respectively. For example, glyphs may be tilted at +45° or −45° with respect to the longitudinal dimension of substrate 24. Using these binary properties, the glyph marks can be used to create a series of glyph marks representing 0's and 1's embodying a particular coding system.

The glyph marks of enlarged area 23 can be read by an image capture device. The captured image of glyph marks can then be decoded into 0's and 1's by a decoding device. Decoding the glyphs into 0's and 1's creates a glyph code pattern 25. The 0's and 1's of glyph code pattern 25, can be further decoded in accordance with the particular coding system used to create glyph marks .21. Additional processing might be necessary in the decoding stage to resolve ambiguities created by distorted or erased glyphs.

Glyph marks can be implemented in many ways. Apparatus and methods consistent with the invention read and decode various types of glyph code implementations. For example, glyphs can be combined with graphics or may be used as halftones for creating images.

Figure 2:
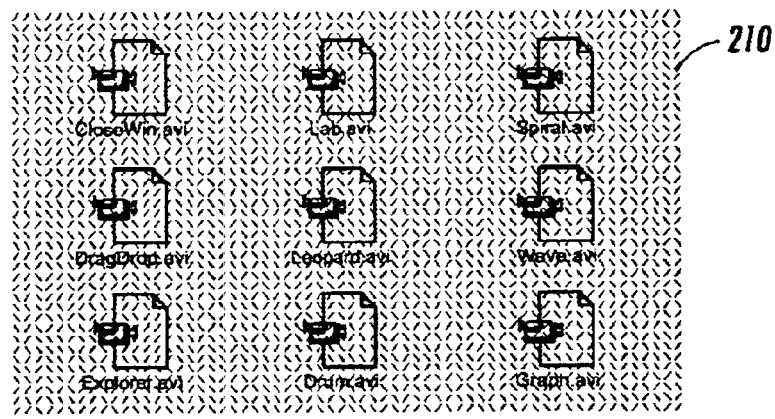
FIG. 2 illustrates an embodiment of an image combining graphics and glyphs consistent with the principles of the present invention.

FIG. 2 illustrates an embodiment of an image 210 combining graphics and glyphs consistent with the present invention. In this particular embodiment, the graphics comprise user interface icons. Each icon comprises a graphic overlaid on glyphs. The glyphs form an address carpet. The glyph address carpet establishes a unique address space of positions and orientations for the image by appropriate coding of the glyph values.

Figure 3:
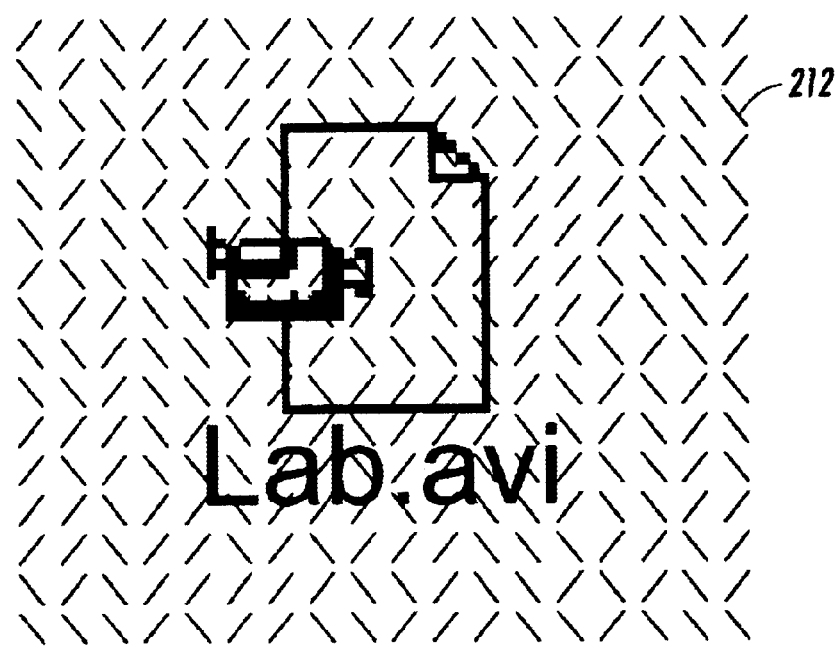
FIG. 3 illustrates an enlarged view of a portion of the image illustrated in FIG. 2.

FIG. 3 illustrates an enlarged view of a portion of image 210 illustrated in FIG. 2. More particularly, portion 212 illustrates the Lab.avi icon overlaying a portion of the address carpet, which unambiguously identifies the icon location and orientation.

Figure 4:
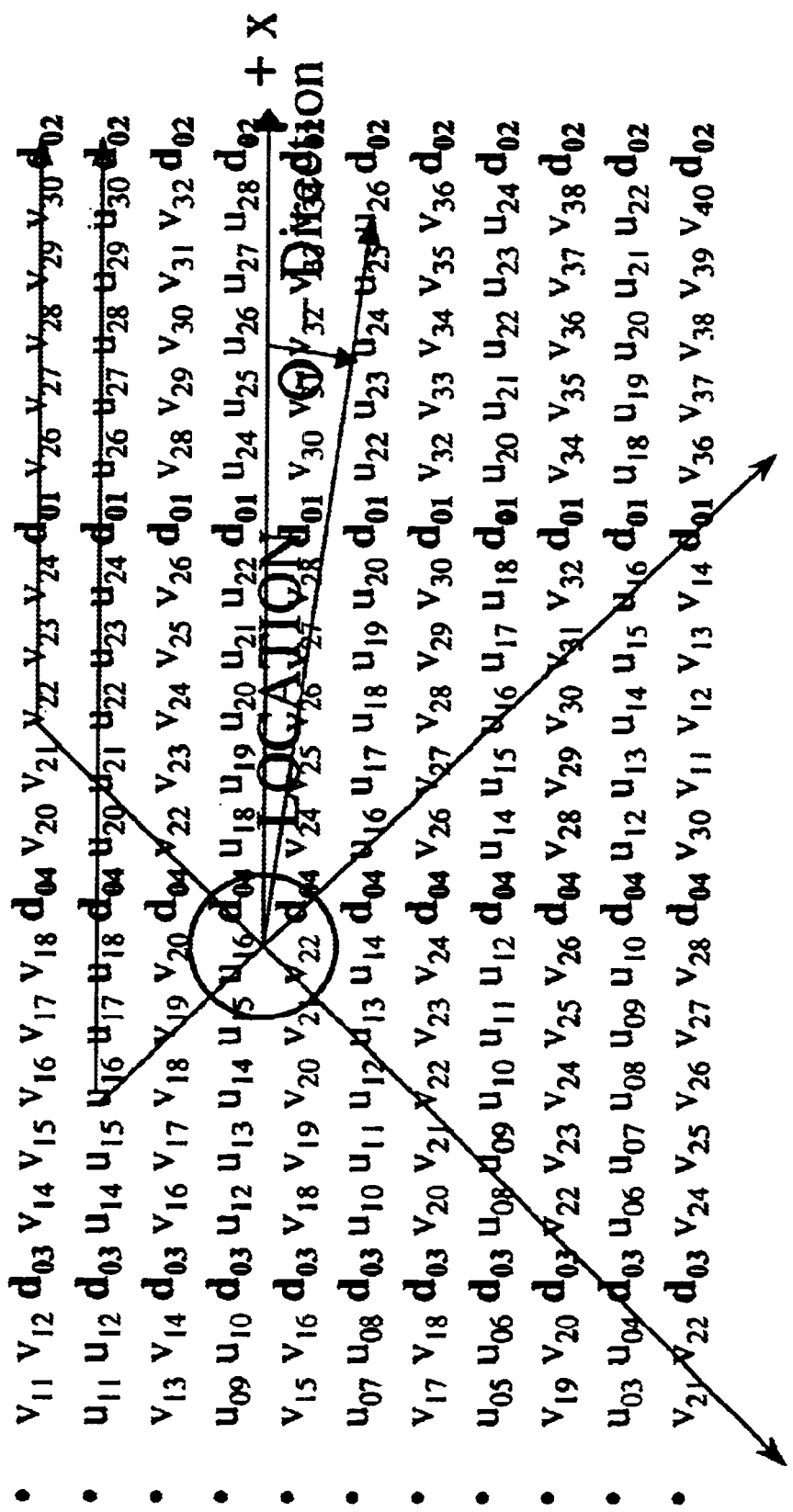
FIG. 4 illustrates an example of a portion of a glyph address carpet code with overlay tiled label code.

FIG. 4 illustrates an example of a portion of a glyph address carpet code with overlay tiled label code. The u and v glyph address codes comprise the address carpet, and the d codes comprise the overlay tiled label code. In this embodiment, rows of u address codes are interleaved with rows of v codes. Each row of u address codes is offset by two positions so that a diagonal line running down and to the right at 45° cuts across identical u codes in every other row. Similarly, each row of v address codes is offset by two positions so that a diagonal line running down and to the left at 45° cuts across identical v codes in every other row. This property of the u and v address codes allows determination of the precise location within the code from a captured of glyphs.

Every sixth column of the address carpet is substituted by d codes, which comprise a label code. A label code may represent additional information, such as a page number or context. The label code in FIG. 4 is a four-bit label code, comprising bits $d_{01}$, $d_{02}$, $d_{03}$, and $d_{04}$. The d codes repeat throughout the address carpet. The d codes substitute for u and v codes. For example, in the top row, $v_{13}$, $v_{19}$, $v_{25}$, and $v_{31}$ are substituted for $d_{03}$, $d_{04}$, $d_{01}$, and $d_{02}$, respectively. In each row, the u and v codes in every sixth column are over written by corresponding d codes. In a captured portion of the address carpet, the d codes can be decoded to provide a label providing information. The d codes could represent, for example, a page number or context information. Thus, if the portion of glyph address carpet illustrated in FIG. 4 were read, codes $d_{03}$, $d_{04}$, $d_{01}$, and $d_{02}$ respectively represented 1, 1, 0, 0, the reordered d codes would form a code of $d_{01}$, $d_{02}$, $d_{03}$, and $d_{04}$, a code of 0011, indicating page or context three (binary 0011=3). The proper logical order of the label code elements (i.e., addressing) is provided by the address code.

From the captured portion of the glyph address carpet code having overlay tiled label code as illustrated in FIG. 4, orientation, location, and a label can be determined. The u and v address codes can be used to determine position, as will be explained in greater detail below, and the d codes provide label information.

Apparatus and methods consistent with the invention read embedded data from a substrate, decode the embedded data to determine registration of the substrate relative to a reference in an apparatus, and develop and present human-sensible information based on the registration information. In one embodiment, the human-sensible information is visual information registered with the substrate. The human-sensible information may also comprise, for example, tactile, audible, or other sensory information.

Figure 5:
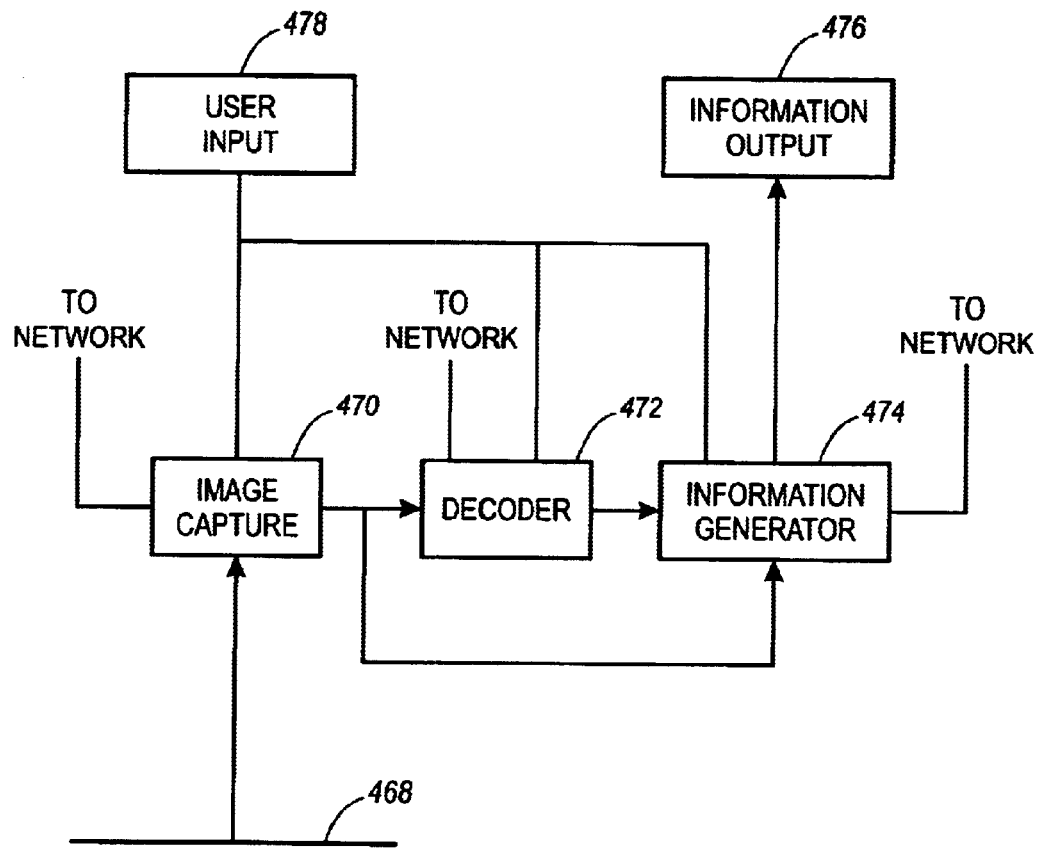
FIG. 5 illustrates a system for reading an image having embedded data, decoding the embedded data in the image, and developing human-sensible information based on the decoded embedded data.

FIG. 5 illustrates a system for reading an image having embedded data, decoding the embedded data in the image, and developing human-sensible information based on the decoded embedded data More particularly, image capture 470 reads substrate 468 to capture an image having embedded data, decoder 472 decodes the embedded data in the captured image, and information generator 474 develops human-sensible information based on the decoded embedded data, and outputs the information to information output 476, which represents one or more information output devices. The human-sensible information may be visual information registered with substrate 468, and additionally or alternatively may comprise other human-sensible information, such as tactile, audible, or other human-sensible information. User input 478 provides user input signals to image capture 470, decoder 472 and information generator 474. The user input may be used in the functionality of each of these elements. For example, user input 478 could be buttons that when depressed send signals to the devices. The signals are processed by each device and may affect their functionality. For example, a selection signal to image capture 470 may cause image capture 470 to capture an image.

Figure 6:
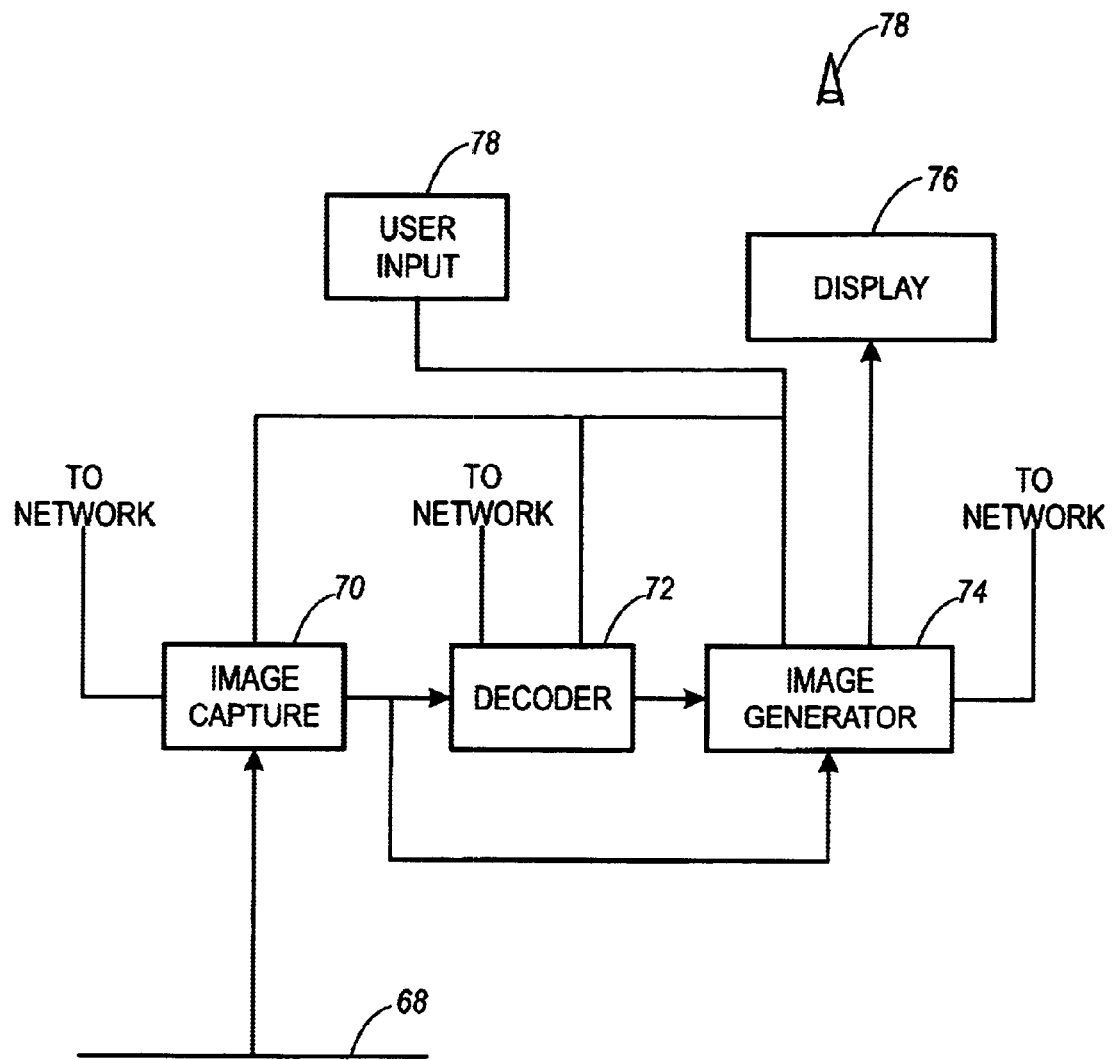
FIG. 6 illustrates a configuration of elements consistent with principles of the present invention.

FIG. 6 illustrates a configuration of elements in accordance with principles consistent with the invention. FIG. 6 is an embodiment of the system illustrated in FIG. 5, and will be used to further describe several principles of the invention. An image capture device 70 captures an image from a substrate 68. Substrate 68 has embedded data, such as glyphs, embodied thereon. Image capture device 70 transfers the captured substrate image to a decoder 72 and an image generator 74. In one embodiment, the embedded data on substrate 68 comprises an address carpet and tiled label code. Decoder 72 analyzes the embedded data in the captured substrate image to determine information regarding the registration of the substrate, such as orientation, location, and label information. These results are transferred to image generator 74 for further processing. User input 78 provides user input signals to image capture 70, decoder 72, and image generator 74. The user input may be used in the functionality of each of these elements, as described with respect to user input 478 of FIG. 5.

Image generator 74 processes the results from decoder 72 and the captured substrate image from image capture device 70. In one embodiment, image generator 74 receives a context code, a location code, and a rotation code from decoder 72. The context code defines a particular context of substrate 68, such as a substrate page number. The location code defines the location on substrate 68 where the captured image was taken from. The rotation gives the orientation of the substrate relative to the image capture device. Using the context code and location code, image generator 74 accesses information related to the context code and location code. For example, if the context code represents substrate page iv, location code indicates location coordinates x=97 and y=92, and rotation =43°, image generator 74 retrieves corresponding information and generates an image registered to the substrate. The rotation code enables registering the orientation of the generated image.

In one embodiment, the retrieved information includes two types of information: image information in the form of a bit map image representation of substrate page iv, and icon information defining the locations and meaning of icons on substrate page iv. Using this information, if the user observes an icon in display 76 that is desired to be selected, the user can provide a selection signal, e.g., via a button. In response, a system attached to the registration system of FIG. 6 (not shown) can use the retrieved meaning of the icon to perform functions corresponding to the icon, as a conventional system would in response to user selection of an icon on a graphical user interface in a conventional display. Such a system is shown and described in U.S. patent application Ser. No. 09/223,882 entitled "Multi-Level Selection Methods and Apparatus Using Context Identification for Embedded Data Graphical User Interfaces," which is expressly incorporated by reference.

The size and scope of the retrieved information may vary. In one embodiment, image generator 74 retrieves an image of substrate 68 that is the same size as the footprint of display 76 and has the same or similar appearance as the area of substrate 68 directly under the footprint of display 76. Because display 76 is aligned with substrate 68, observer 78 looking at display 76 is given the illusion of looking directly onto substrate 68. Image generator 74 may also add information to the image, or alter the retrieved image before sending it to display 76.

The image sent to display 76 may be generated by image generator 74 in many ways. For example, image generator 74 may merely pass on the image captured by image capture 70, or a representation of the image captured by image capture 70. For example, a bitmap representation of the entire substrate 68 could be stored locally in image generator 74 or on a remote device, such as a device on a network. In one embodiment, in response to receiving codes from decoder 72, image generator 74 retrieves from the bitmap representation area of image information corresponding to the codes, and forwards the area image information to display 76 for display to a user. The area retrieved by image generator 74 may be the same size as the image captured by image capture 70, or may be an extended view, including not only a representation of the captured area, but also a representation of an area outside the captured area The latter extended view approach only requires the capture area of image capture 70 to be large enough to capture an image from substrate 68 that includes address codes.

Figure 7:
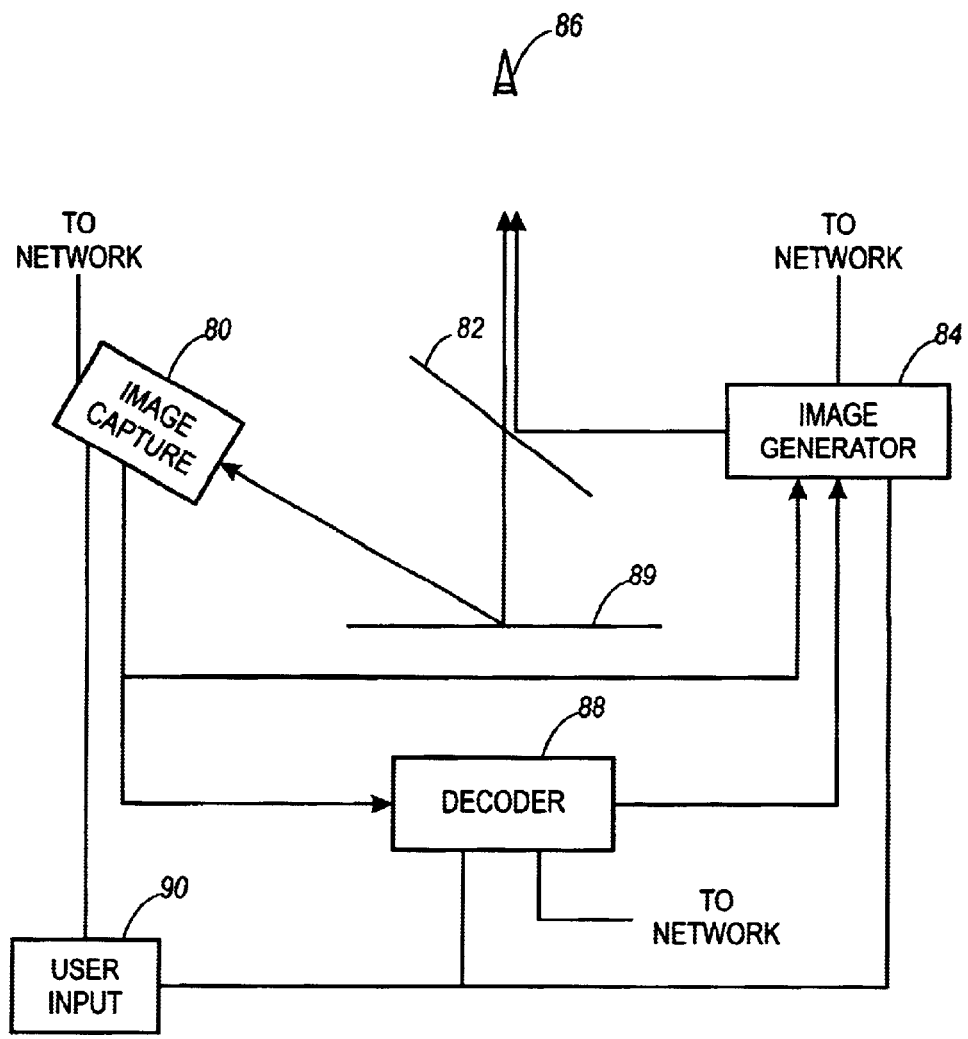
FIG. 7 illustrates another embodiment of a system consistent with the principles of the invention.

FIG. 7 is a diagram illustrating an embodiment of a system consistent with the principles of the invention. A substrate 89 having embedded data thereon is positioned below a semi-transparent mirror 82. An image from substrate 89 is captured by an image capture device 80. Image capture device 80 sends the captured image to a decoder 88, which decodes the image and determines codes from the captured image. Decoder 88 sends the codes to an image generator 84. Image generator 84 processes the codes, creates and/or retrieves image information based on the codes, and sends the image information to semi-transparent mirror 82. User input 90 may also be used to provide user input signals to image capture 80, decoder 88, and image generator 84, as described above with respect to FIGS. 5 and 6.

An observer 86 looking down onto semi-transparent mirror 82 sees the image generated by image generator 84 overlaid on the image from substrate 89. The overlaid information can be dynamically updated and registered with information on substrate 89 based on the decoded image captured by image capture device 80.

In an alternative embodiment, image capture 80 receives the substrate image reflected from semi-transparent mirror 82.

In each of the systems of FIG. 5, FIG. 6, and FIG. 7, the elements may send information to and receive information from network devices, allowing the elements to interact with devices on a network. For example, programs and data may be sent to the elements from network devices, and the devices may send information to the devices on networks. Although each device is illustrated as having its own connection, the devices may also be connected to the network by a common bus.

Figure 8:
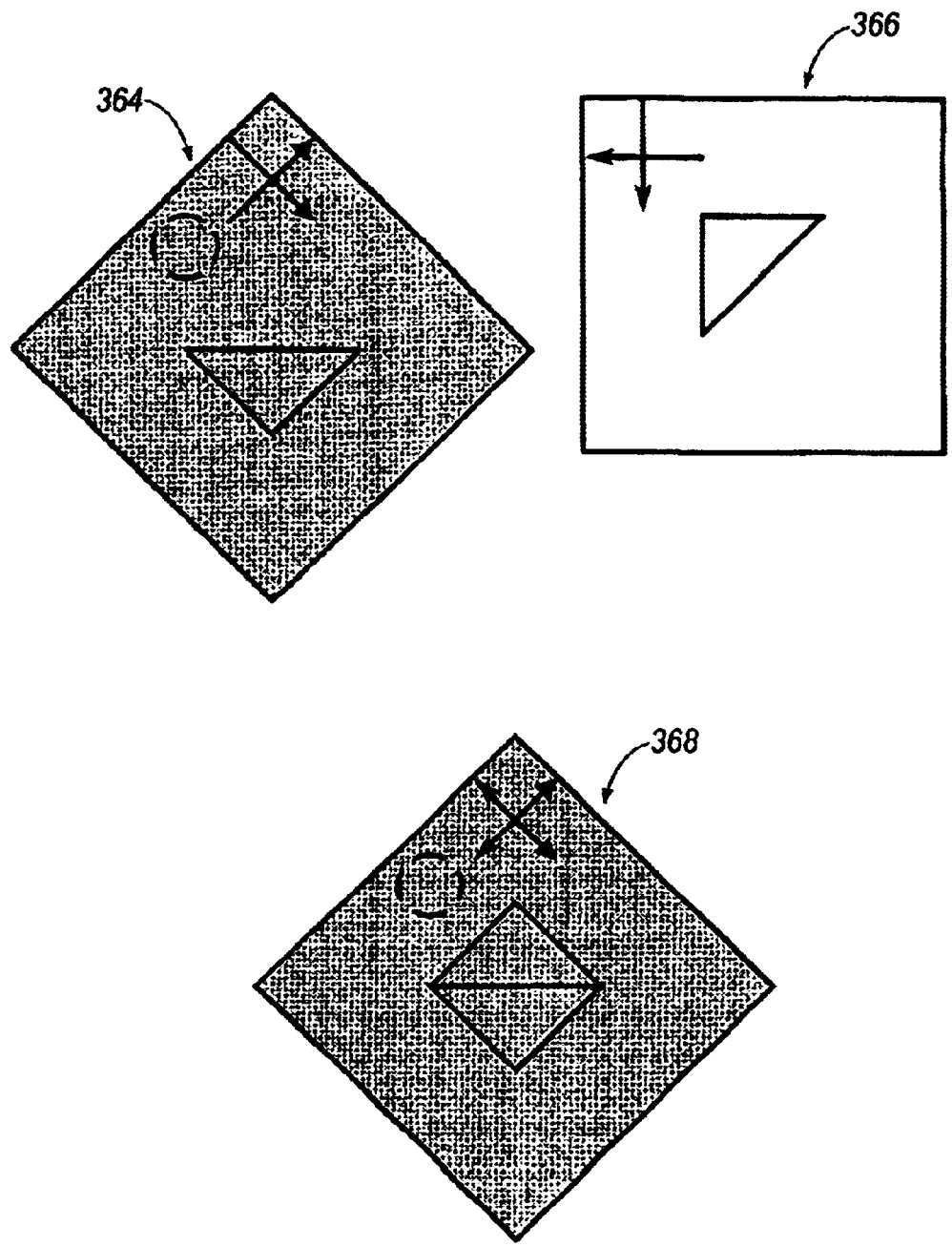
FIG. 8 is a diagram illustrating registration of information consistent with the principles of the invention.

FIG. 8 is a diagram illustrating registration of information consistent with the principles of the invention. The process may be carried out by the apparatus discussed above. Substrate 364 has embedded code embodied thereon, and may have images, such as a triangle. The embedded code embodies a code system from which x,y positions on substrate 364 can be determined. Other code systems encoding additional types of information may also be used.

An image capture device captures a portion of the embedded code of substrate 364. The embedded code is decoded to determine an x,y location address code encoded in the embedded code, and the orientation of substrate 364, represented by the crosshair arrow on substrate 364. The crosshair arrow is shown for purposes of illustrating orientation, but in practice would not necessarily appear on the substrate. In another embodiment, a label code may also be decoded from the captured embedded code.

Based on the x, y location address code and label code, image information 366 is retrieved from storage. The x,y location address code and orientation information decoded from the embedded code embodied on substrate 364 are then used to register image information 366 with substrate 364. These may be used to form a composite image 368.

Figure 9:
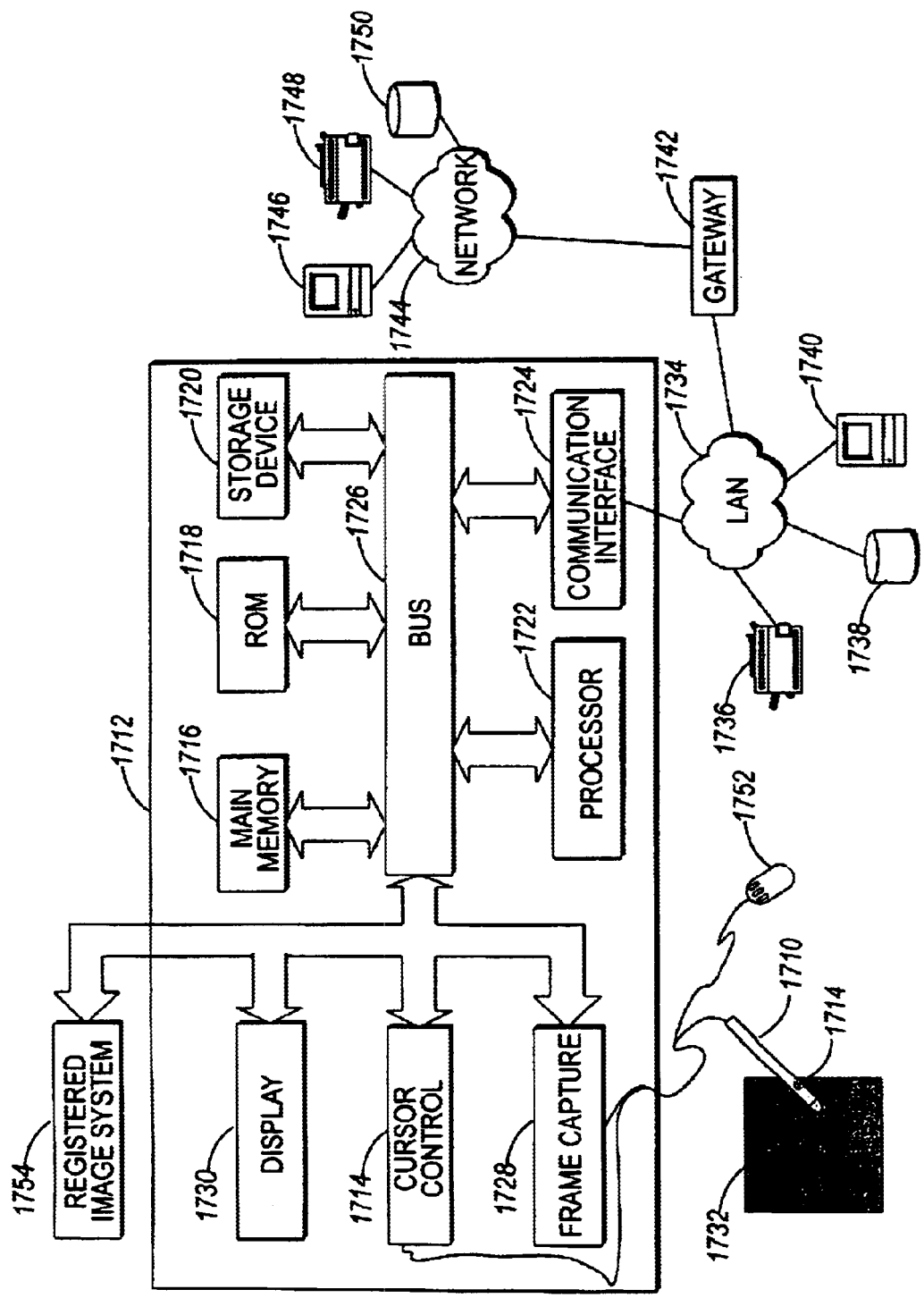
FIG. 9 is a diagram of a user interface image capture system that may be used to capture a user-selected portion of a graphical user interface.

FIG. 9 is a diagram of a user interface image capture system that may be used to capture a user-selected portion of a graphical user interface, such as embedded data glyph user interface substrate 1732, and decode the glyphs in the captured portion. In one embodiment, computer system 1712 is a general purpose computer system, such as a conventional personal computer or laptop computer, that includes main memory 1716, read only memory (ROM) 1718, storage device 1720, processor 1722, and communication interface 1724, all interconnected by bus 1726. Bus 1726 also connects to registered image system 1754, cursor control 1714, and frame capture 1728.

Registered image system 1754 and camera mouse 1752 may be comprised of a system embodying principles as shown and described with respect to FIG. 5, FIG. 6, and FIG. 7, or other registered image system consistent with the principles of the invention. Registered image system 1754 sends a captured image to frame capture 1728, which provides the captured image to processor 1722. Processor 1722 decodes embedded data in the image to determine information, such as x,y location, label, and orientation information as described above, and sends image information based on the decoded information to registered image system 1754. Registered image system 1754 generates an image registered with the substrate based on the image information from processor 1722.

Registered image system 1754 may receive information from the other devices illustrated in FIG. 9, and may transmit information to the devices. This allows other devices, for example on network, to interact with registered image system 1754.

Camera mouse 1752 operates in a manner similar to registered image system 1754. Camera mouse 1752 also includes a mechanism for allowing a user of camera mouse 1752 to view the substrate under camera mouse 1752, as described in greater detail below.

Camera pen 1710 and camera mouse 1752 can provide control signals to processor 1722 in conjunction with the operation of registered image system 1754. Additionally, user interface substrate 1732 may be used as the substrate from which registered image system 1754 captures an image.

Camera pen 1710 is connected to frame capture 1728 and camera mouse 1752 and acts as a pointing device. Camera pen 1710 transmits image information to frame capture 1728. In one embodiment, button 1711 of camera pen 1710 is wired to camera mouse 1752 so that when a user presses button 1711 a signal travels to cursor control 1714. The signal causes processor 1722 to run a program that directs frame capture 1728 to capture the image from camera pen 1710. In another embodiment, both the image line and signal line from camera pen 1710 are input directly into frame capture 1728. The lines between camera pen 1710 and computer 1712 can be wired in any way that provides capture of the image from camera pen 1710.

The user makes a selection by placing camera pen 1710 on or near visual indicia on user interface substrate 1732, and pressing button 1711. Pressing button 1711 causes camera pen 1710 to capture the portion of the user interface substrate 1732 under the tip of camera pen 1710, and transmit the image to computer 1712, via frame capture 1728, for analysis. The button 1711, or multiple buttons, can be used for additional signaling, such as a double click or hold down.

Computer 1712 is also connected to local area network (LAN) 1734 for communicating with devices connected to LAN 1734. For example, LAN 1734 may be connected to a computer 1740, a printer 1736, and a mass storage 1738. LAN 1734 may be also connected to a gateway 1742 for connecting to another network 1744. Network 1744 may be connected to a computer 1746, a printer 1748, and a database 1750. By connecting computer 1712 to LAN 1734 and network 1744, computer 1712 can perform operations using the devices connected to these networks. For example, a document selected for printing by camera pen 1710 or camera mouse 1752 can be printed on printer 1736 or printer 1748. Similarly, a user may use computer 1712 to request a file on database 1750.

In one embodiment, main memory 1716 is a random access memory (RAM) or a dynamic storage device that stores instructions executed by processor 1722. Main memory 1716 may also store information used in executing instructions. ROM 1718 is used for storing static information and instructions used by processor 1722. Storage device 1720, such as a magnetic or optical disk, also stores instructions and data used in the operation of computer system 1712.

Display 1730 may be a liquid crystal display (LCD), or other type of display device. Cursor control 1714 controls cursor movement on display 1730. Cursor control 1714 may be, for example, a mouse, a trackball or cursor direction keys.

The system shown in FIG. 9 can be used to implement the glyph address carpet capture and translation system described herein. The apparatus and methods described herein may be implemented by computer system 1712 using hardware, software, or a combination of hardware and software. For example, the apparatus and methods described herein may be implemented as a program in any one or more of main memory 1716, ROM 1718, or storage device 1720.

In one embodiment, processor 1722 executes programs which analyze captured portions of embedded data glyphs to determine address information encoded in the glyphs.

Such programs may be read into main memory 1716 from another computer-readable medium, such as storage device 1720. Execution of sequences of instructions contained in main memory 1716 causes processor 1722 to perform the process steps consistent with the present invention described herein. Execution of sequences of instructions contained in main memory 1716 also causes processor to implement apparatus elements that perform the process steps. Hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1722 for execution. Such a medium may take many forms, including but not limited to, non-volatile memory media, volatile memory media, and transmission media Non-volatile memory media includes, for example, optical or magnetic disks, such as storage device 1720. Volatile memory media includes RAM, such as main memory 1716. Transmission media includes coaxial cables, copper wire and fiber optics, including the wires that comprise bus 1726. Transmission media can also take the form of acoustic or light waves, such as those generated during radiowave and infrared data communications.

Common forms of computer-readable media include, for example, a floppy disk, a flexible disk, hard disk, magnetic tape, or any other magnetic storage medium, a CD-ROM any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of computer readable media may be involved in carrying one or more sequences of instructions to processor 1722 for execution. For example, the instructions may initially be carried on a magnetic disk or a remote computer. The remote computer can load the instructions into its dynamic memory and send the instructions over a telephone line using a modem. A modem local to computer system 1712 can receive the data on the telephone line and use an infrared transmitter to convert the data to an infrared signal. An infrared detector coupled to appropriate circuitry can receive the data carried in the infrared signal and place the data on bus 1726. Bus 1726 carries the data to main memory 1716, from which processor 1722 retrieves and executes the instructions. The instructions received by main memory 1716 may optionally be stored on storage device 1720 either before or after execution by processor 1722.

Computer system 1712 also includes a communication interface 1724 coupled to bus 1726. Communication interface 1724 provides two way communications to other systems. For example, communication interface 1724 may be an integrated services digital network (ISDN) card or a modem to provide a data communication connection to a corresponding type of telephone line. Communication may also be, for example, a local area network (LAN) card to provide communication to a LAN. Communication interface 1724 may also be a wireless card for implementing wireless communication between computer system 1712 and wireless systems. In any such implementation, communication interface 1724 sends and receives electrical, electromagnetic or optical signals that carry data streams representing various types of information.

The link between communication interface 1724 and external devices and systems typically provides data communication through one or more networks or other devices. For example, the link may provide a connection to a local network (not shown) to a host computer or to data equipment operated by an Internet Service Provider (ISP). An ISP provides data communication services through the world wide packet data communications network now commonly referred to as the "Internet." Local networks and the Internet both use electrical, electromagnetic or optical signals that carry digital data streams. The signals through the various networks and the signals between the networks and communication interface 1724, which carry the digital data to and from computer system 1712, are exemplary forms of carrier waves transporting the information.

Computer system 1712 can send messages and receive data, including program code, through the network(s) via the link between communication interface 1724 and the external systems and devices. In the Internet, for example, a server might transmit a requested code for an application program through the Internet, an ISP, a local network, and communication interface 1724.

Program code received over the network may be executed by processor 1722 as it is received, and/or stored in memory, such as in storage device 1720, for later execution. In this manner, computer system 1712 may obtain application code in the form of a carrier wave.

Several embodiments of camera mice consistent with the principles of the invention will now be described. Although particular features may be discussed with respect to one embodiment, one of ordinary skill will recognize that the principles discussed with respect to one embodiment may also be applied to the other embodiments.

Figure 10:
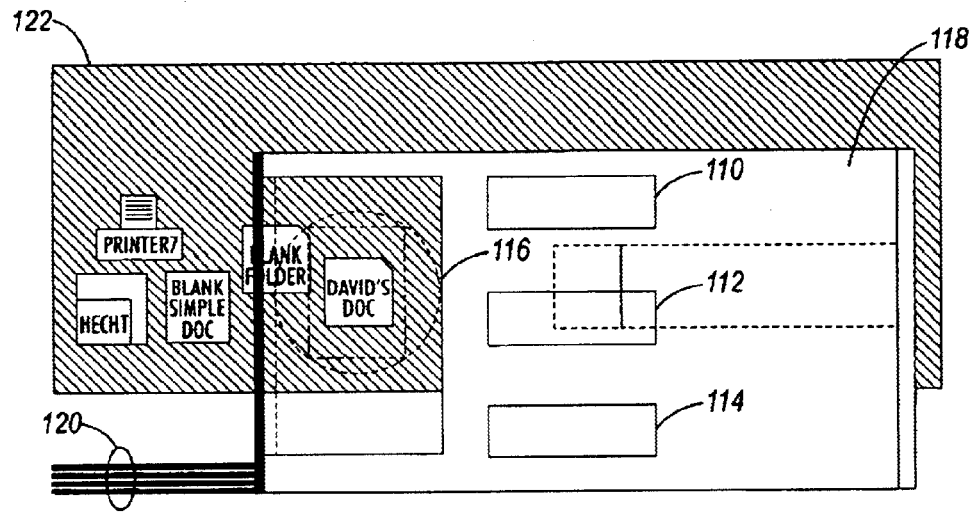
FIG. 10 illustrates another embodiment of an camera mouse system consistent with the principles of the invention.

FIG. 10 is a diagram illustrating a camera mouse consistent with the principles of the invention. Camera mouse 118 is comprised of camera mouse buttons 110, 112, 114, a semi-transparent mirror 116, and a signal cable 120.

The top of camera mouse 118 has a window through which an observer views substrate 122 through semi-transparent mirror 116. Semi-transparent mirror 116 includes target area indicators, shown in FIG. 10 by a broken line circle and a broken line rectangle. An observer places camera mouse 118 over an area of substrate 122, which has embedded code embodied thereon. A camera (not shown) in camera mouse 118 captures the area of substrate 122 defined by the target area indicators in response to the observer activating one or more of camera mouse buttons 110, 112, 114. The image captured by the camera can be processed locally in mouse 118 by a processing element or sent over signal cable 120 for processing by a processing element in a device attached to camera mouse 118.

Because substrate 122 has embedded data embodied thereon, the embedded data captured in the image can be decoded. Thus, camera mouse 118 allows a user to place camera mouse 118 over a particular area of substrate 122 and capture an image of the area of substrate 122 appearing in the target area indicators. The embedded code in the captured image is then decoded by a processing element to develop one or more codes. The codes may represent information about the substrate, such as context, location, and/or orientation.

The processing element analyzes the codes and may perform an operation based on the codes, or queue the codes in a syntax queue to await further codes from images captured by camera mouse 118.

For example, if the user first captures an area of substrate 122 which is decoded to indicate that the location is associated with a particular document icon, this code would appropriately be placed in a syntax queue for later analysis because mere selection of a document icon alone does not constitute a complete operation request from the user. If the user then moves camera mouse 118 over an area of substrate 122 and captures an image which is decoded to represent a printer icon selection, the processing element will analyze this new information in view of the codes in the syntax queue, and determine that the selection of a document icon followed by a printer icon indicates that the selected document should be printed of the printer represented by the associated icon. Therefore, each user selection will typically either result in one or more codes being queued as part of a series of selections or in performance of an operation because a particular syntax criteria has been satisfied. One or more buttons may be used to signal user selections and actions.

Figure 11:
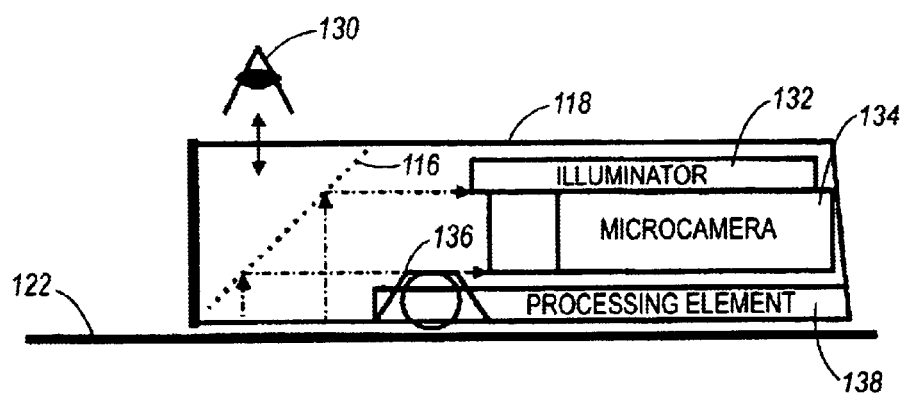
FIG. 11 shows a cutaway side view of the camera mouse shown in FIG. 10.

FIG. 11 is a diagram showing a cutaway side view of the camera mouse shown in FIG. 10. Camera mouse 118 includes an illuminator 132, a camera 134, an XY motion sensor 136, and processing element 138. Processing element 138 processes signals for operation of camera mouse 118. For example, processing element 138 may process signals from XY sensor 136, and images from camera 134.

The balance of processing power between camera mouse 118 and an external system may vary. Different embodiments of camera mouse 118 may have correspondingly different processing performed within camera mouse 118 and outside of camera mouse 118. For example, in one embodiment, processing element 138 merely passes signals to a system, such as system 1712 in FIG. 9, and receives signals from system 1712. In yet another embodiment, the elements of camera mouse 118 communicate directly with an external system, such as system 1712, by sending signals to the system and receiving signals from the system. In another embodiment, camera mouse 118 has a complete processor system contained in the mouse. Moreover, although camera mouse 118 is illustrated as being connected via a wired communications link, it may be connected to other devices by any communications technology, including wireless, radio, or infrared.

XY motion sensor 136 provides conventional mouse movement signals to computer system 1712. The movement signals may be used by computer system 1712 in a conventional manner, or be used in conjunction with processing image data from a substrate and to control how information is displayed on a display of camera mouse 118. For example, the mouse movement signals can be used by computer system 1712 to control a cursor on display 1730 or scroll through a menu displayed on camera mouse 1752.

Illuminators 152 may not be necessary in embodiments where the substrate has sufficient illumination so that an image can be captured therefrom without illumination. For example, in a system where the substrate is backlit or where the substrate is from a view graph projector or computer screen, illuminators may not be necessary. In other embodiments, one or both of illuminator 132 and XY sensor 136 may be removed.

Processing element 138 also processes images from camera 134. Camera 134 receives an image of substrate 122 that is reflected off semi-transparent mirror 116. An observer 130 viewing an image on substrate 122 through semi-transparent mirror 116 may capture the image by pressing one or more of camera mouse buttons 110, 112, or 114. The image of substrate 122 captured by camera 134 is then processed by processing element 138. Although FIG. 11 illustrates processing element 138 located in mouse 118, all or part of the processing may be performed externally by processing elements connected to signal cable 120.

Because substrate 122 has embedded code embodied thereon, the image captured by camera 134 includes an area of the embedded code. This area of embedded code can be decoded and interpreted by a processor. The embedded code covers substrate 122, and each area of embedded code can be decoded into a unique code representing the location. The unique code can then be associated with a particular object selection of the system. A user moves camera mouse 118 over one or more visual representations of system elements, and captures an area on or near the visual representation. As each image is captured, the embedded data in the image is captured and decoded. The decoded result is then analyzed to determine the associated system element. Once the system element associated with the captured location is determined, it is analyzed along with previously selected system elements, if any, to determine whether any actions should be undertaken. For example, returning to FIG. 10, if the area surrounding the David's Document icon is captured, the processor decodes the embedded code surrounding the icon. The result of the decoding indicates that the captured area is associated with the David's Document icon. This is then used for further processing, as is well understood in user interface design. For example, subsequent to selecting of David's Document icon, the user might press another of camera mouse buttons 110, 112, 114 to open the document associated with David's Document icon, analogous to double clicking an icon on a conventional computer display screen. Thus, mice built using principles consistent with the invention may be used to interact with a substrate in much the same way that a user interacts with a conventional electronic display. For example, the user may move camera mouse 118 over particular icons and select the icons, which is analogous to moving a cursor over an electronic display icon and selecting the icon by pressing a mouse button. Multiple clicks on an icon may result in particular operations being performed, and a sequence of icon selections may result in other operations being performed, analogous to an electronic user interface using a conventional electronic display.

Figure 12:
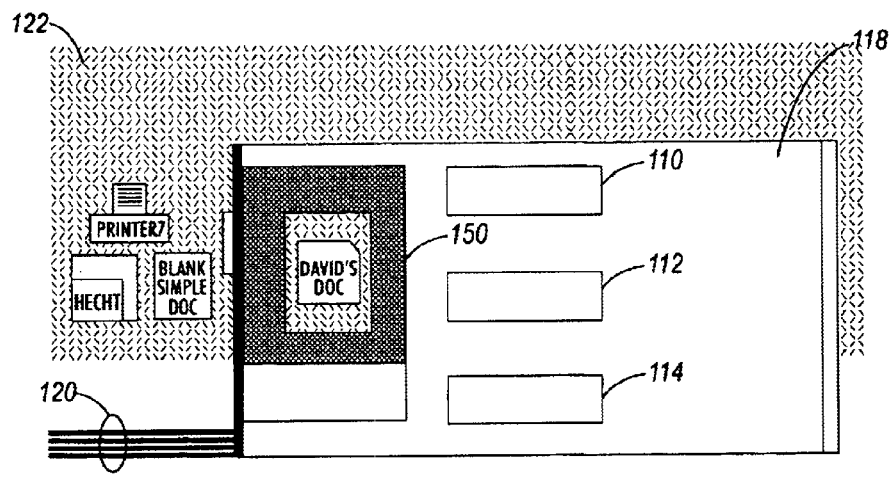
FIG. 12 illustrates an embodiment of a camera mouse having a display consistent with the principles of the invention.

FIG. 12 illustrates an embodiment of a camera mouse having a display consistent with the principles of the invention. In this embodiment, observer 130 views a display 150, such as an LCD screen, located on top of camera mouse 118. Display 150 displays information related to an image captured by camera 134. The information displayed on display 150 may be any type of information related to an image captured by camera 134. Generally, the information is information for assisting the user in operation of camera mouse 118. For example, the information may comprise the actual image captured by camera 134, a representation of the captured image, the actual image captured in addition to other information related to the captured image, or simply information related to the captured image without the captured image. In FIG. 12, an icon representing David's Document is displayed, which shows the user that camera mouse 118 is positioned above David's Document icon on substrate 122.

Figure 13:
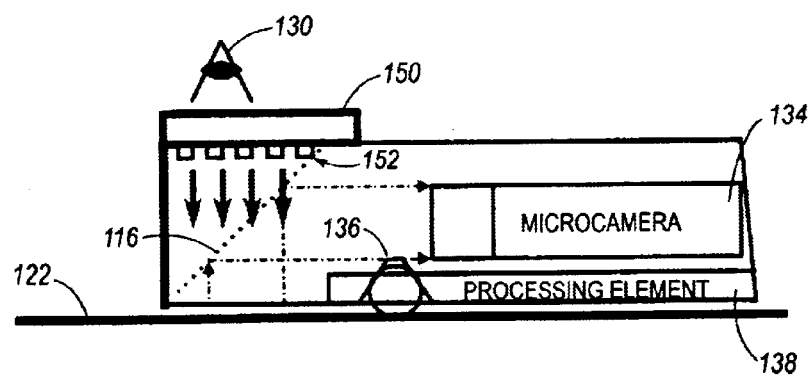
FIG. 13 illustrates a cutaway side view of the camera mouse shown in FIG. 12.

FIG. 13 is a diagram showing a cutaway side view of camera mouse 118. Camera mouse 118 includes a camera 134, an XY motion sensor 136, illuminators 152, and processing element 138. Processing element 138 processes signals from XY motion sensor 136 and images from camera 134. The images may be processed locally, sent to computer system 1712, or a combination of the two.

Camera 134 receives an image of substrate 122 reflected off mirror 116. An observer 130 viewing an image on display 150 may make a selection by pressing one or more of camera mouse buttons 110, 112, or 114. The area of substrate 122 captured by camera 134 is then processed by processing element 138. Although FIG. 13 illustrates processing element 138 located in mouse 118, all or part of the processing may be performed externally by processing elements connected to camera mouse 118 by signal cable 120.

Figure 14:
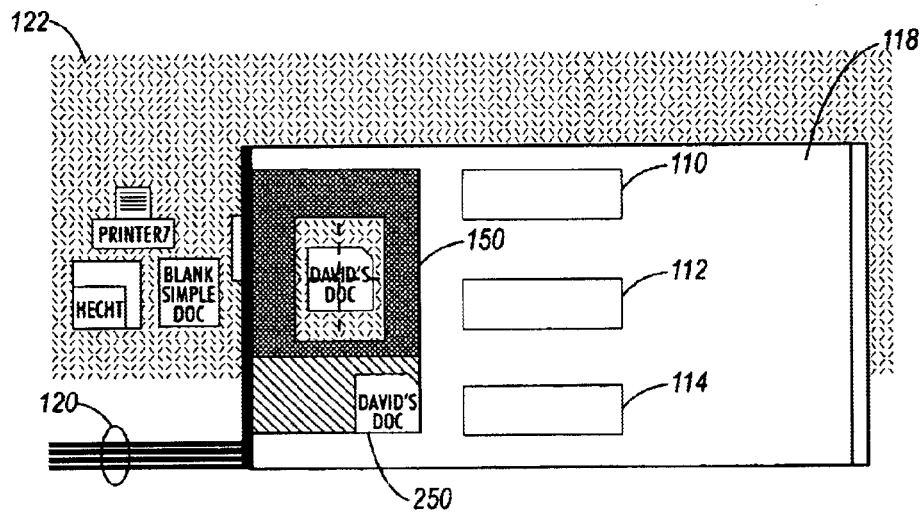
FIG. 14 illustrates a camera mouse embodiment of an image registration system consistent with the principles of the invention.

FIG. 14 illustrates another embodiment of an image registration system consistent with the principles of the invention. Camera mouse 118 is comprised of camera mouse buttons 110, 112, 114, and a signal cable 120. A camera (not shown) in camera mouse 118 captures the area of substrate 122 defined by the target area indicators in response to the observer activating one or more of camera mouse buttons 110, 112, 114. The image captured by the camera can be processed locally in mouse 118 by a processing element (not shown) or sent over signal cable 120 for processing by a processing element in a device attached to camera mouse 118.

Because substrate 122 has embedded data embodied thereon, the embedded data captured in the image can be decoded. Thus, camera mouse 118 allows a user to place camera mouse 118 over a particular area of substrate 122 and capture an image of the area of substrate 122, which is then displayed in display 150. The embedded code in the captured image is decoded by a processing element to develop decoded information. The decoded information may represent information about the substrate, such as context, location, and/or orientation. The processing element analyzes the decoded information and may perform an operation based on the decoded information and button controls, or queue the codes and button controls in a syntax queue to await further codes and button controls.

Based on the decoded information, image information is generated and displayed as an image on display 150. Several types of image information may be displayed. For example, the information may comprise the actual image captured by camera 134, a representation of the captured image, the actual image captured in addition to other information related to the captured image, or simply information related to the captured image without the captured image. In one embodiment, a representation of the substrate is retrieved and combined with the captured image to form a composite image on display 150 that shows the captured image and the extended area surrounding the captured image.

Display 150 shows David's Docum icon, which is the captured image, with superimposed cross hairs. Display 150 also shows an image 250 of David's Docum, indicating that icon has been selected by the user. For example, if the user places the mouse over David's Docum, the mouse captures the image of David's Docum from substrate 122, and displays the captured image on display 150. If the user then activates a mouse button to select the icon, a representation of the David's Docum icon is displayed in display 150 as David's Docum icon 250.

Figure 15:
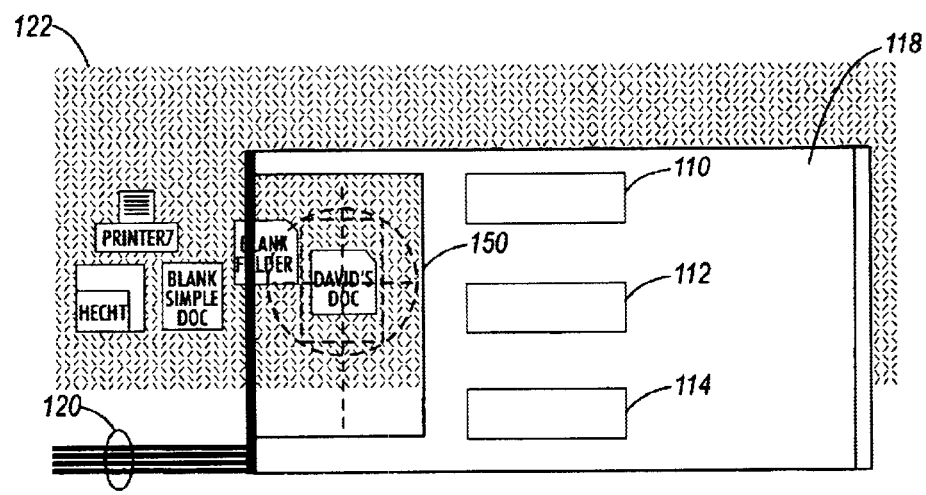
FIG. 15 illustrates one embodiment of extended display information provided on a camera mouse consistent with the principles of the invention.

FIG. 15 is a diagram illustrating another embodiment of display information on a camera mouse display. FIGS. 15-19 illustrate a series of user selections illustrating an example of using camera mouse 118 to cause a system to perform particular functions. Display 150 displays a larger image capture field, which includes a broken line circle, a broken line rectangle, and a cross hair cursor, shown by crossing broken lines. Unlike FIG. 12, where only the capture area within the rectangular box is displayed, FIG. 15 illustrates displaying a larger area representing substrate 122 on display 150. The user selects the icon in the target area for capture by pressing one of camera mouse buttons 110, 112, 114.

Figure 16:
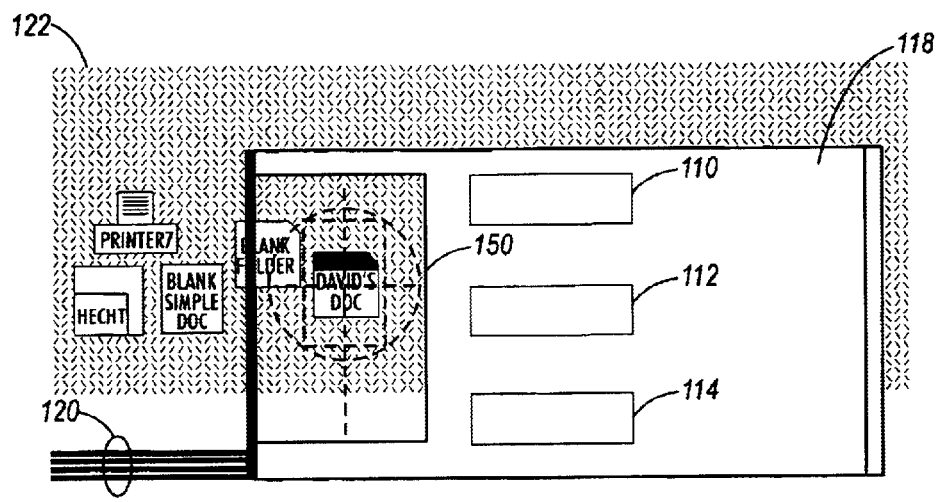
FIG. 16 illustrates highlighting an icon to provide feedback to a user that an icon has been selected.

FIG. 16 illustrates highlighting an icon on the display to provide feedback to a user that an icon has been selected. More particularly, after user selects the David's Document icon, the selection is highlighted in display 150, for example, by showing the icon in a different color.

Figure 17:
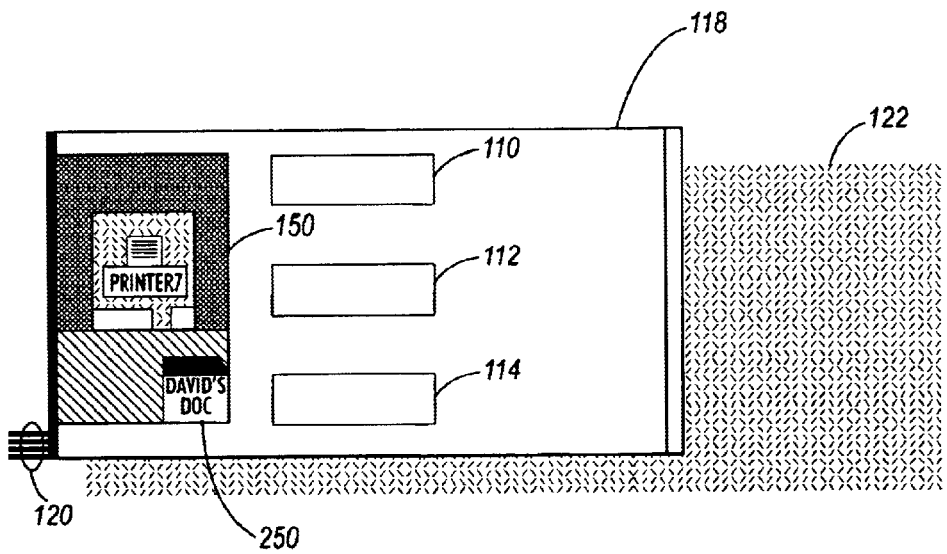
FIG. 17 illustrates a cursor display superimposed on an analogue captured image of a printer icon with a highlighted abstract view document icon carried with it.

FIG. 17 illustrates a cross hair cursor superimposed over an image of a printer icon with a highlighted abstract view of document icon 250 carried with it. Continuing from the point of the selection being highlighted as illustrated in FIG. 16, once the icon is highlighted, it can be selected for further processing by pressing one of camera mouse buttons 110, 112, 114. This action causes David's Document icon 250 to appear in the lower-right corner of display 150, which indicates that the icon has been selected for next action. By moving camera mouse 118 over substrate 122 until the printer icon appears under the cross hairs on display 150, and activating one of camera mouse buttons 110, 112, 114, microcamera 134 captures the printer icon image from substrate 122, and the embedded data in captured image is processed by processing element to determine that an area associated with a printer icon has been captured. Because icon 250 captured for next action is a document icon, the processing element directs the system connected to camera mouse 118 to print the document associated with document icon 250 on the printer associated with the captured printer icon.

Figure 18:
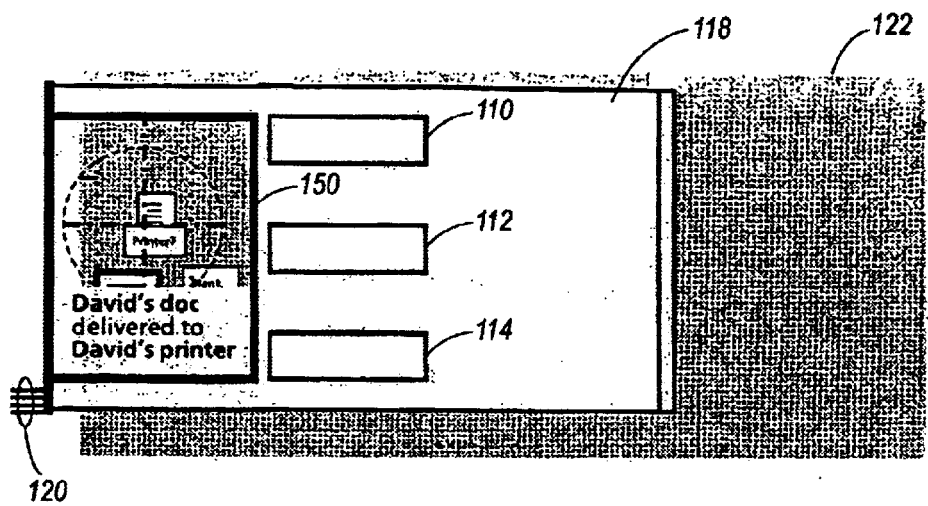
FIG. 18 illustrates an analogue captured image of a printer icon with confirmation of document transfer to a printer.

FIG. 18 illustrates a camera mouse display confirming a document has been transferred to a printer. Once camera mouse 118 has been moved so that the printer icon is in the cross hairs of display 150, and the user selects the printer icon, such as by depressing a mouse button, the system provides feedback in display 150 in the form of text, notifying the user that David's Document has been delivered to the printer associated with the selected printer icon.

Figure 19:
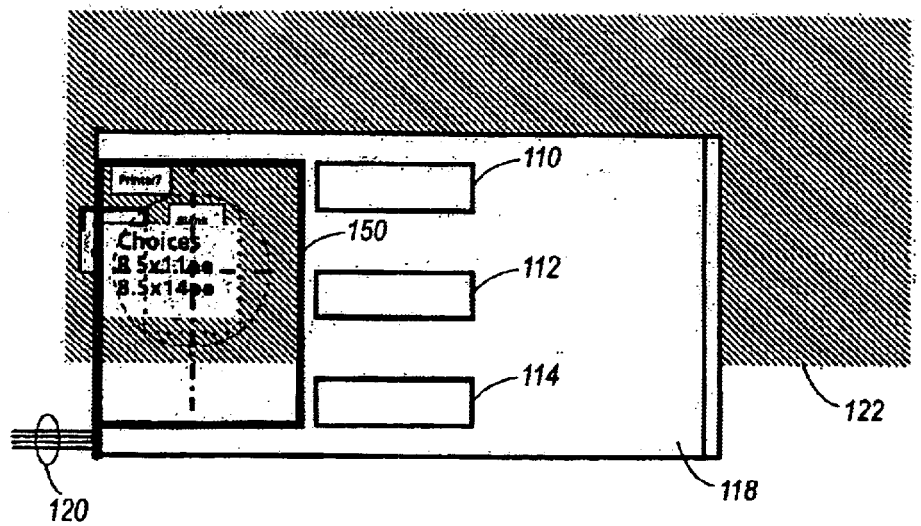
FIG. 19 illustrates cursor drag to a menu choice displayed on the camera mouse.

FIG. 19 illustrates a cursor scroll drag operation to select a menu choice. Menu choices are displayed on display 150 and scrolled through, in a similar fashion to a pull down menu on a conventional computer electronic display screen. The user may scroll through the displayed menu choices in a variety of ways. For example, the user may scroll through the menu choices by moving camera mouse 118, causing the mouse ball to move, sending XY motion signals to the computer, which in turn causes camera mouse 118 to provide a visual indication on display 150 that selections are being scrolled through. Alternatively, the mouse buttons can be used. For example, the right and left mouse buttons can be used to scroll through the menu choices and the middle key can be used to select the desired menu choice. Thus, the user can be presented with a variety of menu choices and select the desired menu choice.

Figure 20:
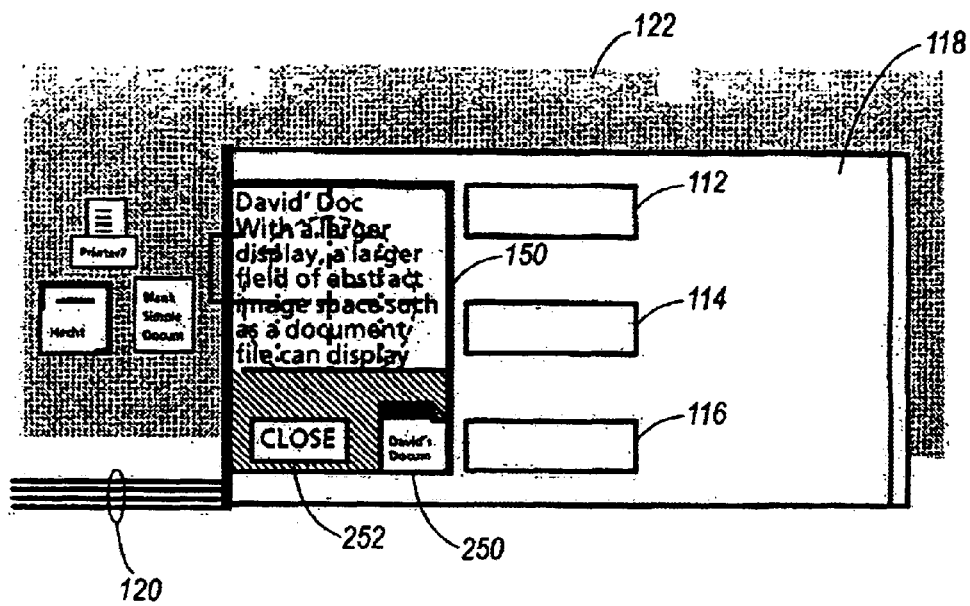
FIG. 20 shows a document image, a highlighted abstract view icon captured for next action, and an action button.

FIG. 20 is a diagram illustrating a camera mouse cursor superimposed on the text of the document represented by a highlighted icon captured for next action. By selecting an icon and then opening it, information associated with the icon can be displayed on display 150. For example, if David's Document icon 250 is selected and opened, the text of the document can be displayed on display 150 for review by the user. Thus, display 150 of camera mouse 118 can be used both as a way to interact with the embedded code on substrate 122 as well as view information associated with the images captured from substrate 122. The user can close the opened document by selecting close button 252 For example, mouse button 116 could be used to activate close button 252 to close the display of text and display 150.

Figure 21:
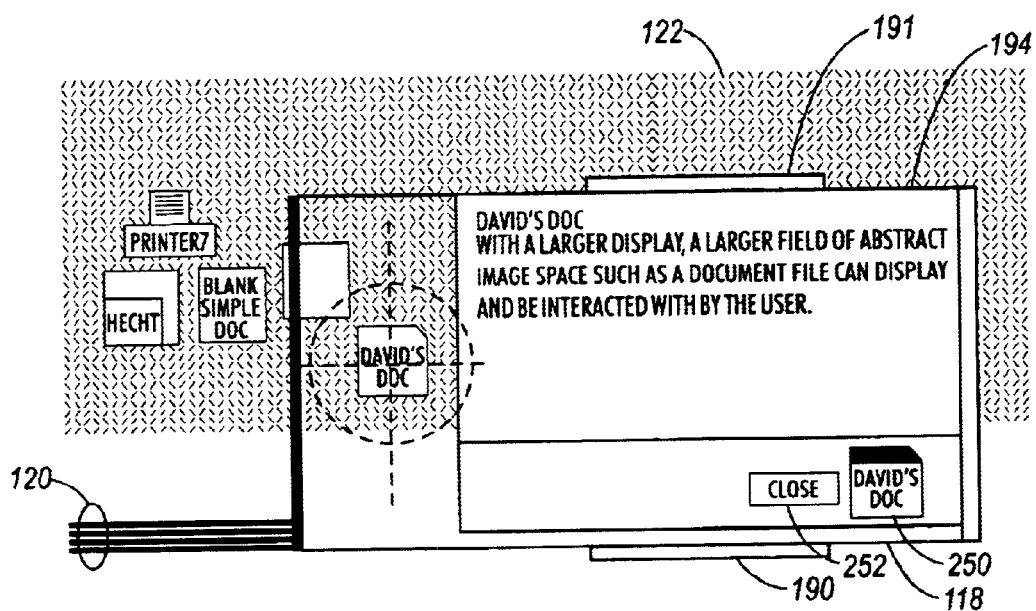
FIG. 21 illustrates one use of the extended display on the camera mouse.

FIG. 21 is a diagram illustrating an image capture field boundary and cursor displayed on an extended view, with a highlighted selected icon. By using larger display screen, the user can view not only a representation of the underlying substrate captured by the microcamera, but may also view other information in a window 194. Window 194 may display any information associated with use of mouse 118, or other information, such as advertising. For example, window 194 may include the text of a document associated with a particular icon, command buttons, such as close button 252, or captured icons, such as David's Document 250.

Figure 22:
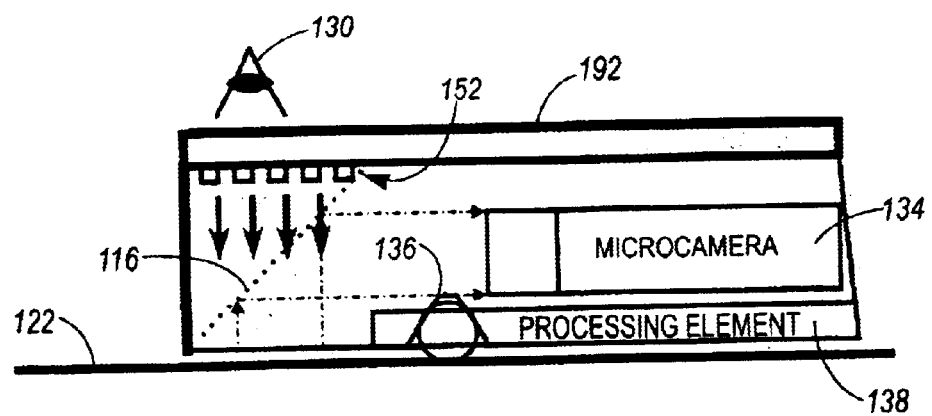
FIG. 22 illustrates a side view of the camera mouse of FIG. 21, showing the extended display along the entire length of the camera mouse.

FIG. 22 illustrates a side view of the camera mouse of FIG. 21, showing display 192 extended along the entire length of the camera mouse.

Figure 23:
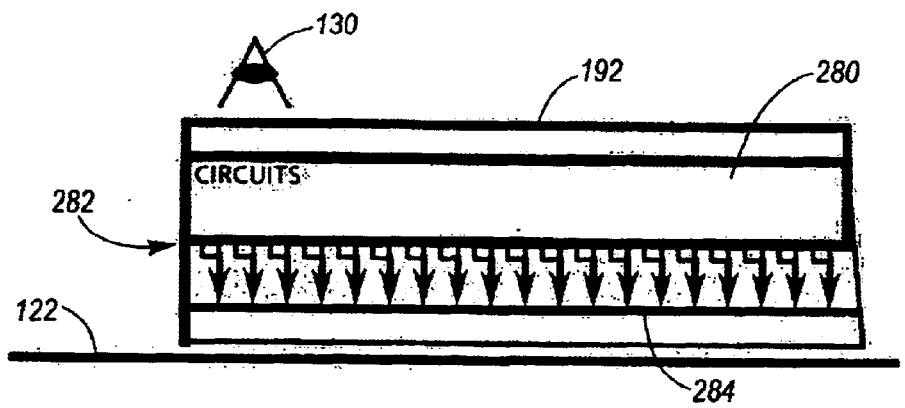
FIG. 23 is a diagram illustrating the side view of a camera mouse having a display across the entire upper surface of the mouse and an image sensor covering the lower surface.

FIG. 23 is a diagram illustrating the side view of a camera mouse capable of capturing and displaying the entire area of substrate 122 under the mouse. Camera mouse 118 includes circuits 280 running across the entire length and width of camera mouse 118. Circuits 280 are connected to illuminators 282, which illuminate image capture sensor 284. Capture sensor 284 receives the image from substrate 122 and sends the image information to circuits 280 for display on all or a portion of fill length display screen 192. By capturing the entire substrate image under the footprint of camera mouse 118, the user may be presented with more information regarding the area of substrate 122 under the mouse.

Figure 24:
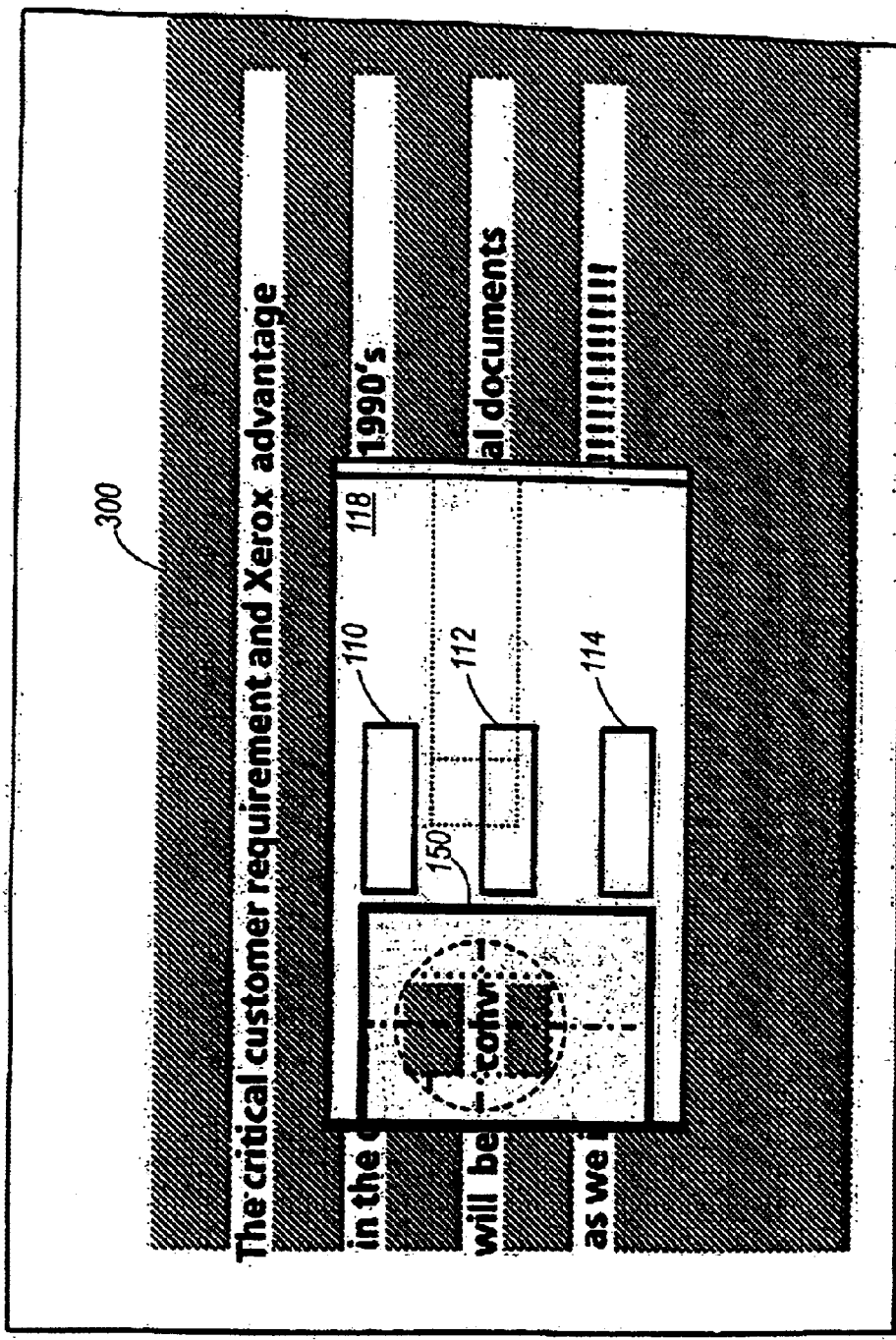
FIG. 24 illustrates a camera mouse on text on an embedded data code.

FIG. 24 illustrates a camera mouse on text on embedded data, illustrating a text print GUI Camera mouse 118 is positioned over embedded data carpet 300, which includes several lines of text thereon. The user positions camera mouse 118 until a particular area of interest is displayed in the cross hairs of display 150. Further operations may then be performed on the selected area.

Figure 25:
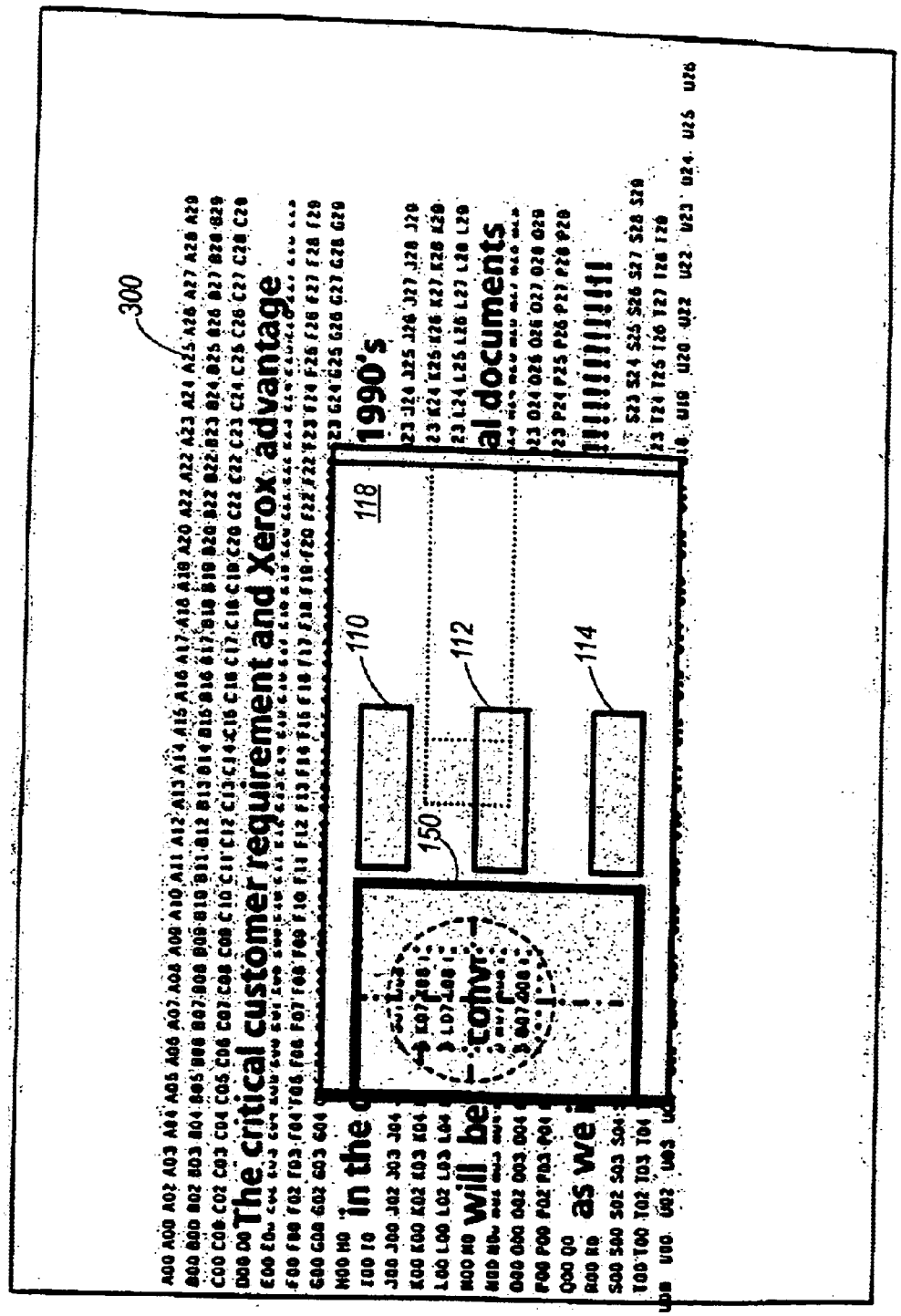
FIG. 25 shows a camera mouse on text on an embedded data carpet.

FIG. 25 is a diagram illustrating a camera mouse on embedded data. More particularly, FIG. 25 illustrates an example of a coding scheme of substrate 300. The codes are shown for purposes of illustration only. An implementation of the system would implement the code in glyphs. The broken line capture area of display 150 illustrates the codes that are captured as a result of the capture of the image surrounding the letters "conv." By capturing the image, the processing element in camera mouse 118 can determine which area of the glyph address carpet 300 the captured image is from, and perform further operations based on the determination.

Figure 26:
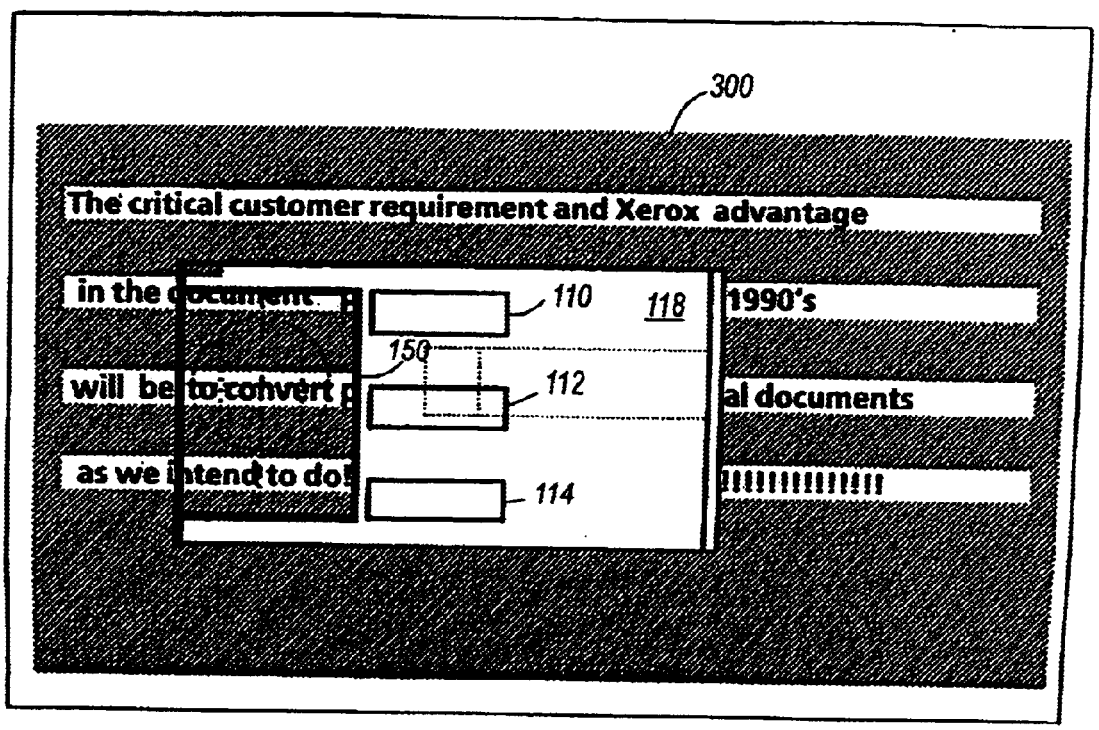
FIG. 26 illustrates a camera mouse on text on an embedded data carpet having an extended display view.

FIG. 26 is a diagram illustrating a camera mouse on text on an embedded data illustrating a text print GUI.

Figure 27:
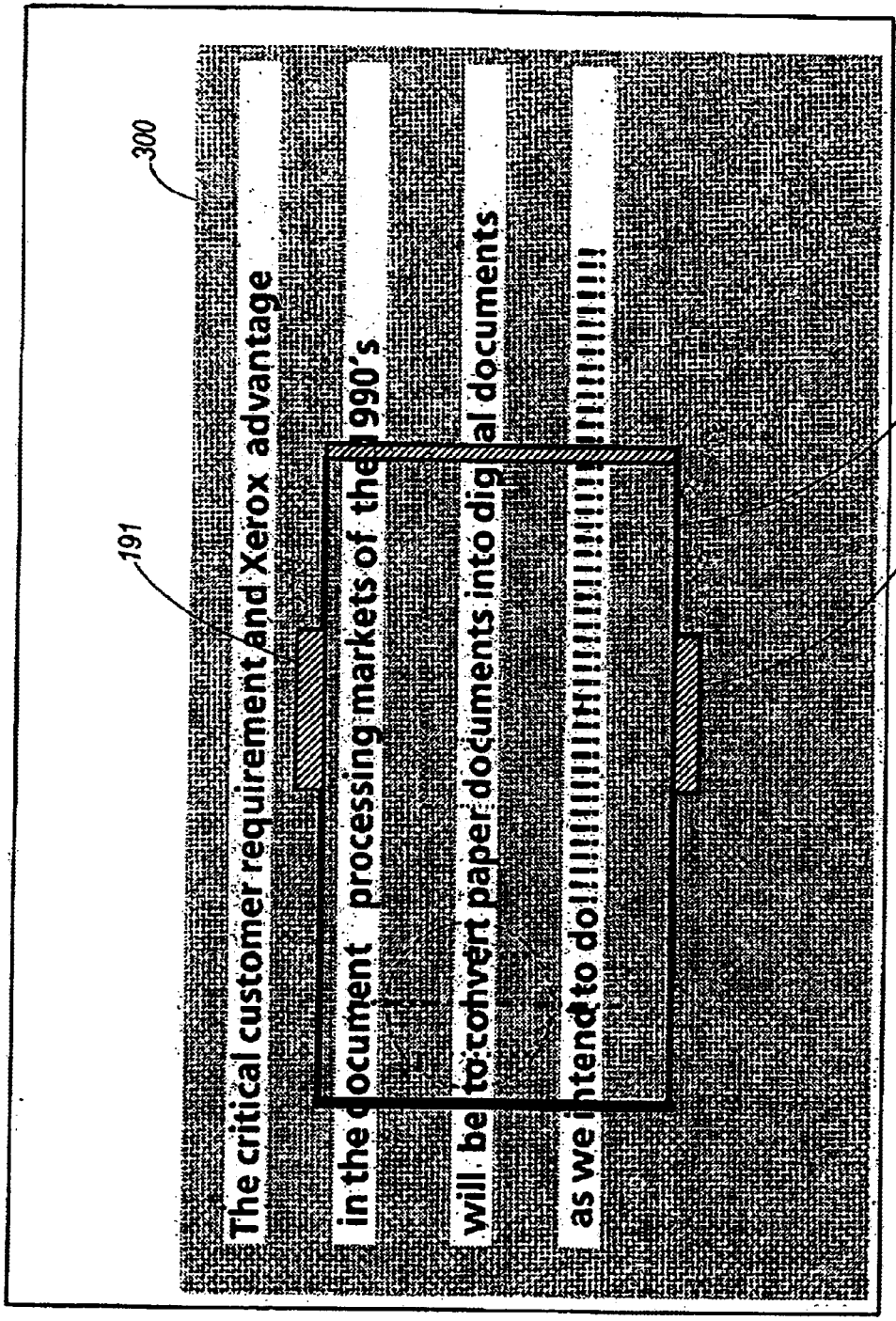
FIG. 27 illustrates a full-length display camera mouse on text on an embedded data carpet.

FIG. 27 is a diagram illustrating a camera mouse on text on an embedded data carpet. More particularly, FIG. 27 illustrates a mouse having a full length and full width display for displaying information corresponding to the substrate beneath the camera mouse. This allows a user of the camera mouse to visualize the entire area under the footprint of the mouse.

Figure 28:
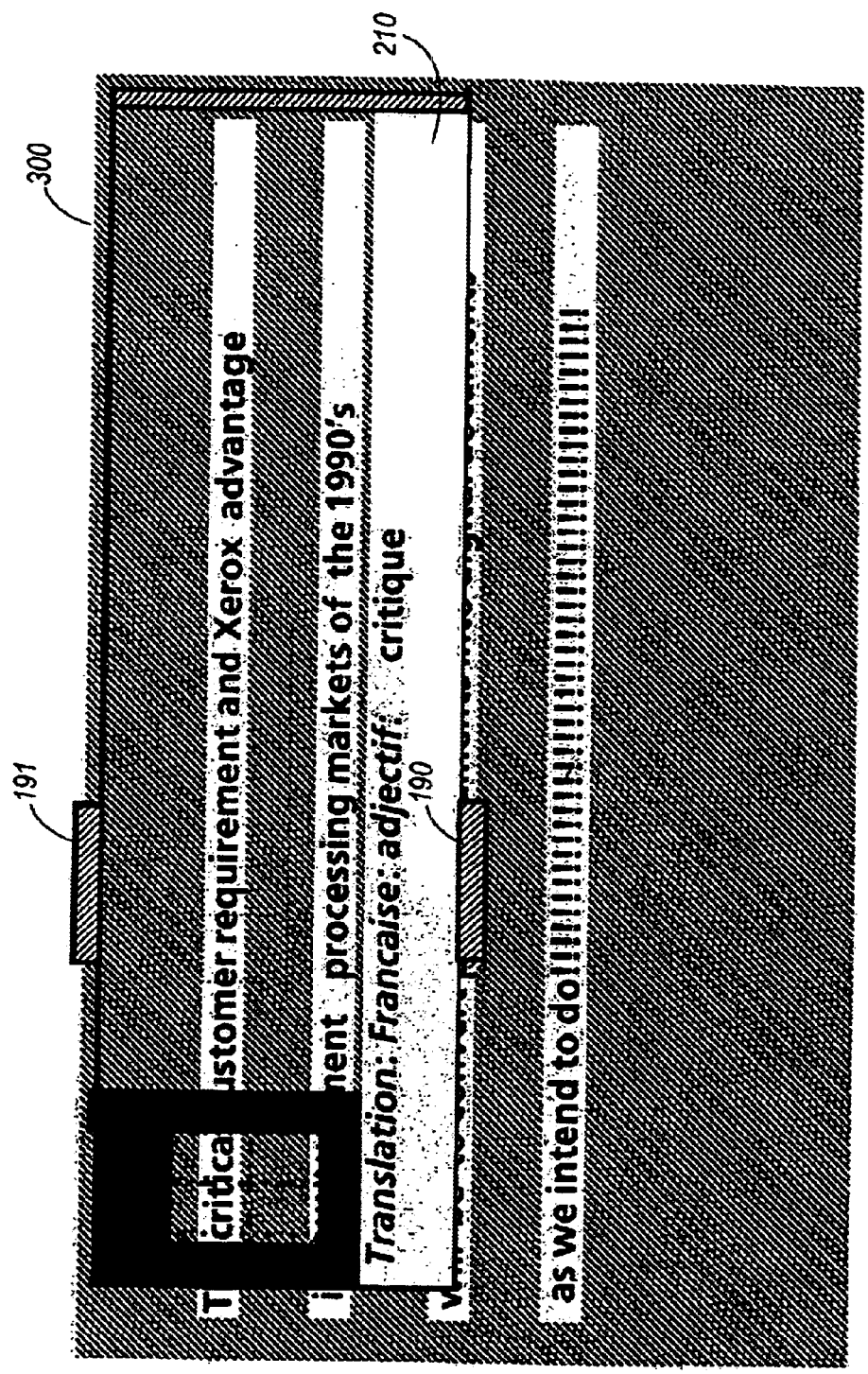
FIG. 28 shows a language translation application on a full-length display camera mouse on text on an embedded data carpet.

FIG. 28 is a diagram illustrating a translation on a full width camera mouse on text on an embedded carpet. In this embodiment, the user positions the mouse over a particular area of interest, in this case, the letters "critica", captures the area of interest on embedded data 300 by depressing a mouse button, and processes the captured image. The embedded codes in the captured area of interest are decoded to determine which location was selected. Based on the decoded information, the processing element determines that the word of interest is the word "critical", which is then translated by the processing element and the translation is shown in window 210 on the camera mouse. Window 210 may display types of information other than translation information as well. For example, window 210 may provide synonyms of the word or other information related to the text.

Figure 29:
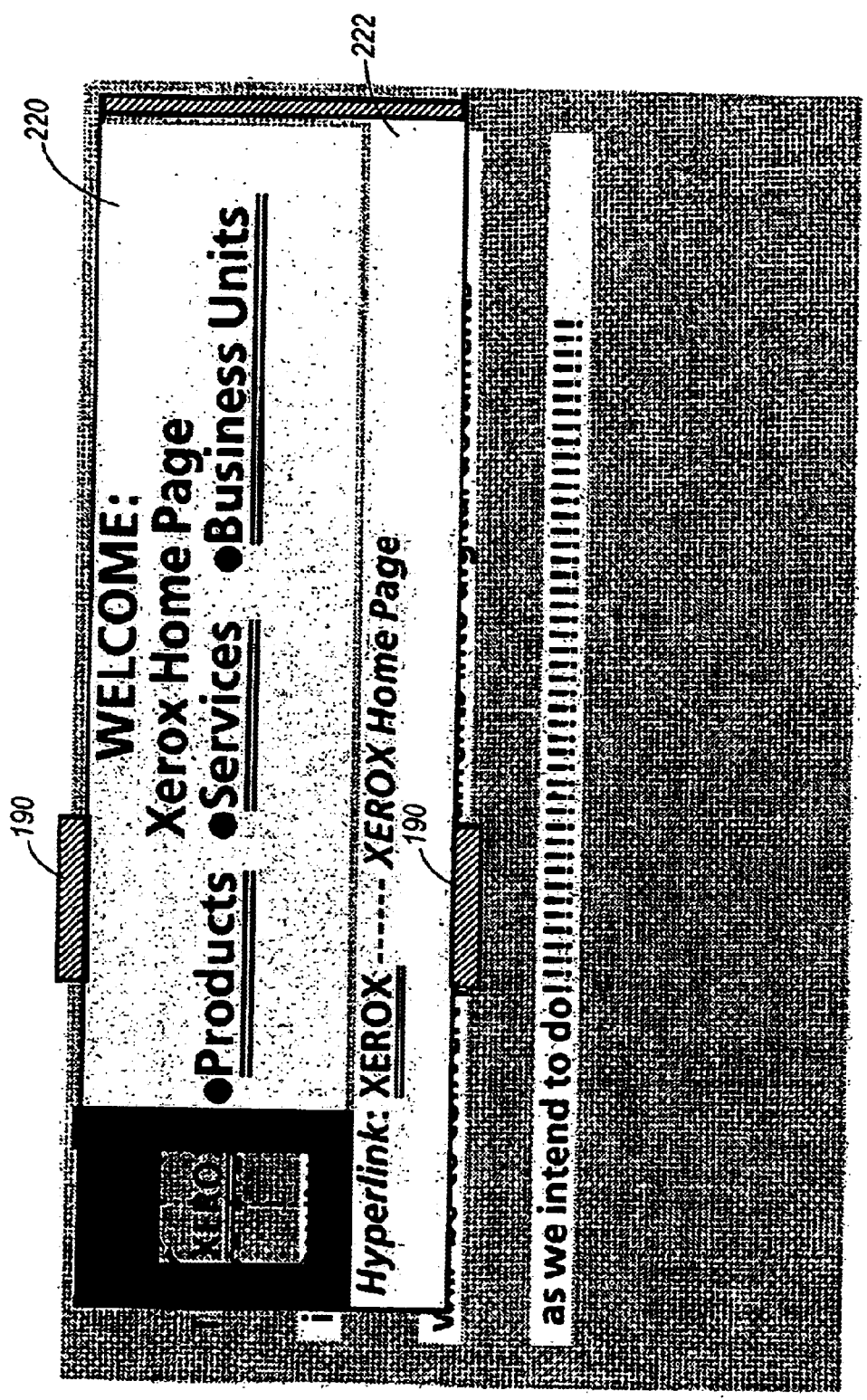
FIG. 29 shows a hyperlink application on a full-length display camera mouse.

FIG. 29 is a diagram illustrating a hyperlink application on a large display camera mouse on text with embedded data More particularly, FIG. 29 illustrates the use of other information related to the captured area of interest. In the example shown in FIG. 29, the area of interest on embedded data carpet 300 is the word "Xerox." Window 220 displays information related to Xerox, in this example the Xerox home page, and window 222 shows information defining what is being displayed, in this example a hyperlink into the Xerox web page. The user may then selectively request more information based on the information in windows 220 and 222 by moving the mouse and activating the mouse buttons on either side of the mouse for further selections.

CONCLUSION

Other embodiments of the invention will be apparent to those skilled in the art from consideration of the specification and practice of the disclosed embodiments. The specification and examples are exemplary only, and the true scope and spirit of the invention is defined by the following claims and their equivalents.

What is claimed is:

1. An apparatus for capturing information about a visible object in a first image disposed on a substrate, comprising:
   means for providing a viewing area for assisting a user in positioning the apparatus over an image region of the first image disposed on the substrate; the image region including the visible object and coded embedded data indicating information about the visible object; the coded embedded data forming a uniform background for the visible object; and
   means for capturing the coded embedded data from the image region, said embedded data including an orientation of the substrate and a location of the coded embedded data on the substrate.

2. The apparatus of claim 1, further comprising means for decoding the coded embedded data to develop a code indicating a relative position of the apparatus and the substrate.

3. The apparatus of claim 1, wherein the viewing area comprises a semi-transparent mirror.

4. The apparatus of claim 1, wherein the viewing area comprises a display for displaying a second image based on the coded embedded data.

5. The apparatus of claim 4, wherein the second image comprises information registered with the image region.

6. The apparatus of claim 4, wherein the second image comprises a representation of the image region.

7. The apparatus of claim 4, wherein the second image comprises information related to the visible object in the first image based on a user selection.

8. The apparatus of claim 1, wherein the means for capturing coded embedded data comprises a camera.

9. The apparatus of claim 1, further comprising means for providing user input signals.

10. The apparatus of claim 1, further comprising means for creating signals indicating relative movement of the apparatus and substrate.

11. The apparatus of claim 1, further comprising illumination means for illuminating the substrate.

12. The apparatus of claim 1, wherein the coded embedded data is a glyph code.

13. A method for capturing information from a substrate comprising:

positioning an apparatus over an image region of a first image disposed on the substrate using a viewing area of the apparatus; the image region including a visible object and coded embedded data indicating information about the visible object; the coded embedded data forming a uniform background for the visible object; and capturing the coded embedded data from the image region using the apparatus, said embedded data including an orientation of the substrate and a location of the coded embedded data on the substrate.

14. The method of claim 13, further comprising decoding the coded embedded data to develop a code indicating a relative position of the apparatus and the substrate.

15. The method of claim 13, wherein the viewing area comprises a semi-transparent mirror.

16. The method of claim 13, further comprising displaying on a display attached to the apparatus a second image based on the coded embedded data.

17. The method of claim 16, wherein the second image comprises information registered with the image region.

18. The method of claim 16, wherein the second image comprises a representation of the image region.

19. The method of claim 16, wherein the second image comprises information about the visible object in the first image based on a user selection.

20. The method of claim 13, wherein the apparatus includes a camera for capturing the coded embedded data.

21. The method of claim 13, further including providing user input signals.

22. The method of claim 13, further including creating signals indicating relative movement of the apparatus and substrate.

23. The method of claim 13, further including illuminating the substrate.

24. The method of claim 13, wherein the coded embedded data is a glyph code.

25. A manually moveable apparatus for interacting with an image disposed on a substrate and for communicating with a data store including information about the image; the apparatus comprising:

image capture means for capturing an image region of the image on the substrate; the image region including an object visible to a user and coded embedded data indicating identification information about the visible object; the coded embedded data forming a uniform background for the visible object;

a display for displaying the image region captured by the image capture means;

signal generation means for a user to generate an operation signal indicating a request to perform an operation related to the visible object; and communication means for sending the operation signal and the identification information to a processor; the processor using the identification information to retrieve second information about the visible object from the data store; the processor further using the operation signal to determine the operation to perform using the second information; the processor further using the second information about the visible object to display an output image on the display as feedback to the user in response to generating the operation signal.

26. The apparatus of claim 25 further including illumination means for illuminating the image region of the image on the substrate.

27. The apparatus of claim 25 wherein the processor is included in the manually moveable apparatus, and wherein the apparatus further comprises decoding means for decoding the coded embedded data to produce the identification information about the visible object.

28. The apparatus of claim 25 wherein the processor includes at least first and second processors;

the first processor being included in the handheld apparatus, and wherein the apparatus further comprises decoding means for decoding the coded embedded data to produce the identification information about the visible object; and the second processor being included in a computer system separate from the manually moveable apparatus; the computer system including decoding means for decoding the coded embedded data to produce the identification information about the visible object; the second processor retrieving the second information about the visible object from the data store and using the second information to determine the operation to perform.

* * * * *